(12) United States Patent
Nishiguchi et al.

(10) Patent No.: US 11,242,453 B2
(45) Date of Patent: *Feb. 8, 2022

(54) HEAT-RESISTANT CHLORINE-CONTAINING CROSSLINKED RESIN FORMED BODY AND METHOD FOR PRODUCING THE SAME, SILANE MASTER BATCH, MASTER BATCH MIXTURE AND FORMED BODY THEREOF, AND HEAT-RESISTANT PRODUCT

(71) Applicant: FURUKAWA ELECTRIC CO., LTD., Tokyo (JP)

(72) Inventors: Masaki Nishiguchi, Tokyo (JP); Arifumi Matsumura, Tokyo (JP); Hidekazu Hara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 16/059,266

(22) Filed: Aug. 9, 2018

(65) Prior Publication Data

US 2018/0346700 A1 Dec. 6, 2018

Related U.S. Application Data

(63) Continuation of application No. PCT/JP2017/004945, filed on Feb. 10, 2017.

(30) Foreign Application Priority Data

| Feb. 12, 2016 | (JP) | ............................. JP2016-024491 |
| Mar. 31, 2016 | (JP) | ............................. JP2016-071733 |

(51) Int. Cl.

| *C08L 11/00* | (2006.01) |
| *C08L 23/28* | (2006.01) |
| *C08L 27/06* | (2006.01) |
| *C08K 5/14* | (2006.01) |
| *C08K 3/26* | (2006.01) |
| *C08J 3/22* | (2006.01) |
| *C08J 3/24* | (2006.01) |
| *B29B 7/90* | (2006.01) |
| *H01B 3/44* | (2006.01) |
| *B29B 7/74* | (2006.01) |
| *C08J 3/18* | (2006.01) |
| *C08K 3/22* | (2006.01) |
| *C08K 5/5425* | (2006.01) |

(Continued)

(52) U.S. Cl.
CPC .......... *C08L 23/286* (2013.01); *B29B 7/7495* (2013.01); *B29B 7/90* (2013.01); *B29B 7/905* (2013.01); *C08J 3/18* (2013.01); *C08J 3/22* (2013.01); *C08J 3/226* (2013.01); *C08J 3/24* (2013.01); *C08K 3/26* (2013.01); *C08K 5/14* (2013.01); *C08L 11/00* (2013.01); *C08L 23/28* (2013.01); *C08L 27/06* (2013.01); *H01B 3/445* (2013.01); *B29B 7/183* (2013.01); *B29B 7/42* (2013.01); *B29B 7/46* (2013.01); *B29B 7/82* (2013.01); *C08J 2311/00* (2013.01); *C08J 2327/06* (2013.01); *C08J 2423/28* (2013.01); *C08K 3/22* (2013.01); *C08K 3/36* (2013.01); *C08K 5/5425* (2013.01); *C08K 2003/2224* (2013.01); *C08K 2003/2227* (2013.01); *C08K 2003/265* (2013.01); *C08L 2203/206* (2013.01); *C08L 2312/02* (2013.01); *C08L 2312/08* (2013.01)

(58) Field of Classification Search
CPC .. C08L 23/283; C08L 23/286; C08L 2312/08; C08L 11/00; C08L 27/06; C08J 3/24; C08J 3/22
USPC ......................................................... 525/104
See application file for complete search history.

(56) References Cited

U.S. PATENT DOCUMENTS

| 7,589,154 B2 * | 9/2009 | Rakhman ............ C08F 255/023 |
| | | 525/195 |
| 2006/0155072 A1 * | 7/2006 | Rakhman ................ C08L 51/06 |
| | | 525/242 |

(Continued)

FOREIGN PATENT DOCUMENTS

| JP | 60-144315 | 7/1985 |
| JP | 06-168629 | 6/1994 |

(Continued)

OTHER PUBLICATIONS

International Search Report dated Mar. 28, 2017 in PCT/JP2017/004945 filed Feb. 10, 2017 (with English Translation).

*Primary Examiner* — Margaret G Moore
(74) *Attorney, Agent, or Firm* — Oblon, McClelland, Maier & Neustadt, L.L.P.

(57) ABSTRACT

A production method comprising: (a) a step of melt-mixing a base resin containing a chlorinated polyethylene; an organic peroxide, an inorganic filler, and a silane coupling agent, in specific ratios, at a temperature equal to or higher than a decomposition temperature of the organic peroxide, to prepare a silane master batch; (b) a step of mixing the silane master batch obtained in the step (a) with a silanol condensation catalyst, and then forming the resultant mixture; and conducting at least one of the melt-mixing in the step (a) and the mixing in the step (b) is performed in the coexistence of a chloroprene rubber or a polyvinyl chloride; a heat-resistant chlorine-containing crosslinked resin formed body produced by the method, a silane master batch, a mixture and formed body thereof, and a heat-resistant product.

16 Claims, No Drawings

(51) Int. Cl.
    *C08K 3/36*    (2006.01)
    *B29B 7/42*    (2006.01)
    *B29B 7/82*    (2006.01)
    *B29B 7/46*    (2006.01)
    *B29B 7/18*    (2006.01)

(56) References Cited

U.S. PATENT DOCUMENTS

| | | | |
|---|---|---|---|
| 2012/0128906 A1* | 5/2012 | Jackson | C08F 8/42 |
| | | | 428/35.1 |
| 2016/0208060 A1 | 7/2016 | Nishiguchi et al. | |
| 2018/0346664 A1 | 12/2018 | Nishiguchi et al. | |
| 2018/0346700 A1 | 12/2018 | Nishiguchi et al. | |

FOREIGN PATENT DOCUMENTS

| | | |
|---|---|---|
| JP | 10-081802 | 3/1998 |
| JP | 2000-143935 | 5/2000 |
| JP | 2000-315424 | 11/2000 |
| JP | 2001-101928 | 4/2001 |
| JP | 2001-240719 | 9/2001 |
| JP | 2008-184613 | 8/2008 |
| JP | 2012-255077 | 12/2012 |
| JP | 2014-136752 | 7/2014 |
| JP | 2015-146303 | 8/2015 |
| WO | WO 2013/147148 A1 | 10/2013 |
| WO | WO 2015/046476 A1 | 4/2015 |

* cited by examiner

HEAT-RESISTANT CHLORINE-CONTAINING CROSSLINKED RESIN FORMED BODY AND METHOD FOR PRODUCING THE SAME, SILANE MASTER BATCH, MASTER BATCH MIXTURE AND FORMED BODY THEREOF, AND HEAT-RESISTANT PRODUCT

CROSS-REFERENCE TO RELATED APPLICATIONS

This application is a Continuation of PCT International Application No. PCT/JP2017/004945 filed on Feb. 10, 2017, which claims priority under 35 U.S.C. § 119 (a) to Japanese Patent Application No. 2016-024491 filed in Japan on Feb. 12, 2016 and No. 2016-071733 filed in Japan on Mar. 31, 2016. Each of the above applications is hereby expressly incorporated by reference, in its entirety, into the present application.

TECHNICAL FIELD

The present invention relates to a heat-resistant chlorine-containing crosslinked resin formed body and a method for producing the same, a silane master batch, a master batch mixture and a formed body thereof, and a heat-resistant product.

BACKGROUND ART

Wiring materials such as insulated wires, cables, cords, optical fiber core wires or optical fiber cords (optical fiber cables), used in an electrical and electronic equipment field and an industrial field are required to have various characteristics such as flame retardancy, heat resistance and mechanical characteristics (for example, tensile properties and abrasion resistance).

In addition, these wiring materials or cables are used outdoors, or immersed into oil (in a state in which the materials may be brought into contact with machine oil or the like) and used in several cases. The wiring material or the like used for such an application is required to have weather resistance or oil resistance in addition to the above-described characteristics. Specific examples of this wiring material used for the electric wire include a resin material or a crosslinked resin material excellent in oil resistance or weather resistance in an outermost layer.

As the above-described wiring material or the like, specifically, a polyolefin resin such as polyethylene, or as the material excellent in weather resistance or oil resistance, a chlorine-containing resin such as a chlorinated polyethylene resin and chloroprene rubber is widely used.

Specific examples of a method for crosslinking a resin or rubber generally include a chemical crosslinking method, and when a crosslinked material is produced, specific examples thereof include an electron beam crosslinking method or a chemical crosslinking method.

For example, as methods for crosslinking polyolefin resins such as polyethylene, known so far include: electron beam crosslinking methods in which the resin is crosslinked by irradiation with electron beams, and chemical crosslinking methods, such as a crosslinking method in which heat is applied after forming, to decompose organic peroxide or the like and to allow a crosslinking reaction, and a silane crosslinking method.

Herein, the silane crosslinking method means a method of obtaining a crosslinked resin, by obtaining a silane-grafted resin by allowing a grafting reaction of a silane coupling agent having an unsaturated group in the presence of organic peroxide, and then bringing the silane-grafted resin into contact with moisture in the presence of a silanol condensation catalyst.

Among the above-described crosslinking methods, in particular, the silane crosslinking method requires no special facilities in many cases, and therefore can be employed in a wide range of fields.

As the silane crosslinking method for polyolefin resins, for example, Patent Literature 1 proposes a method of sufficiently melt-kneading an inorganic filler subjected to surface treatment with a silane coupling agent; a silane coupling agent, an organic peroxide, and a crosslinking catalyst, to a polyolefin-based resin, by a kneader, and then forming the resultant material by a single screw extruder.

On the other hand, when the chlorine-containing resin is crosslinked, the resin has been crosslinked so far according to the chemical crosslinking method using the organic peroxide.

It is more difficult to allow silane crosslinking of the chlorine-containing resin than allowing silane crosslinking of the above-described polyolefin resin, according to the silane crosslinking method. A crosslinked body of the chlorine-containing resin is unable to be obtained merely by allowing a silane grafting reaction of the silane coupling agent having the unsaturated group with the chlorine-containing resin in the presence of organic peroxide to obtain a silane-grafted resin, and then bringing the silane-grafted resin into contact with moisture in the presence of the silanol condensation catalyst.

CITATION LIST

Patent Literatures

Patent Literature 1: JP-A-2001-101928 ("JP-A" means unexamined published Japanese patent application)

SUMMARY OF INVENTION

Technical Problem

However, when the silane grafting reaction is performed by using a kneader or a Banbury mixer in the above described silane crosslinking method of polyolefin resins, the silane coupling agent having the unsaturated group generally has high volatility and has a problem that it volatilizes before participating in the silane grafting reaction. Therefore, it has been difficult to prepare a desired silane crosslinked master batch containing the silane-grafted resin.

Further, in the method described in Patent Literature 1, a resin is crosslinked during melt-kneading by a kneader or the like in several cases. Further, most of a silane coupling agent other than the silane coupling agent applied to surface treatment of an inorganic filler is volatilized or causes condensation with each other in several cases. Therefore, a coated electric wire having desired heat resistance is unable to be obtained. In addition thereto, appearance (hereinafter, referred to as "extrusion appearance" in several cases) of a formed body such as an electric wire obtained by coating a conductor by extrusion forming according to a condensation reaction between the silane coupling agents is deteriorated in several cases.

Incidentally, among the chlorine-containing resins, chlorinated polyethylene generally exhibits adhesiveness in a non-crosslinked state. Accordingly, if non-crosslinked chlorinated polyethylene formed bodies are brought into contacted with each other, the formed bodies are adhered to each other to cause appearance roughness in several cases. In particular, a crosslinking reaction is performed after forming in the silane crosslinking method. Therefore, if the non-crosslinked chlorinated polyethylene formed bodies are crosslinked in a state in which the formed bodies are adhered (for example, in a state in which the electric wire is wound around a bobbin in the case of the electric wiring), and then crosslinked formed bodies are peeled off, the above-mentioned adhered portions are fractured to cause external damage or break on a surface of the formed body.

The present invention aims to solve at least one of the above-described problems, and is contemplated for providing a heat-resistant chlorine-containing crosslinked resin formed body having excellent appearance, and a method for producing the formed body.

The present invention is further contemplated for providing a heat-resistant chlorine-containing crosslinked resin formed body that exhibits excellent oil resistance and weather resistance, is excellent in heat resistance, is not melted even at a high temperature (a temperature not particularly limited, but is preferably 150° C. or higher), has particularly reduced poor extrusion appearance among poor appearances, and also is excellent in appearance, and a method for producing the formed body.

In addition, the present invention is contemplated for providing a silane master batch or a master batch mixture, from which the heat-resistant chlorine-containing crosslinked resin formed body can be formed, and a formed body thereof.

Further, the present invention is contemplated for providing a heat-resistant product containing the heat-resistant chlorine-containing crosslinked resin formed body obtained according to the production method for the heat-resistant chlorine-containing crosslinked resin formed body.

The present invention is still further contemplated for providing a heat-resistant chlorine-containing crosslinked resin formed body that has particularly reduced poor extrusion appearance and poor appearance (appearance roughness) caused by adhesiveness of a base resin among poor appearances, and has excellent appearance, and a method for producing the formed body.

In addition, the present invention is still further contemplated for providing a silane master batch or a master batch mixture capable of forming a heat-resistant chlorine-containing crosslinked resin formed body and a formed body thereof.

Further, the present invention is still further contemplated for providing a heat-resistant product containing the above-described heat-resistant chlorine-containing crosslinked resin formed body.

Solution to Problem

The present inventors found that a heat-resistant chlorine-containing crosslinked resin formed body that exhibits excellent oil resistance and weather resistance, is excellent in heat resistance, and is not melted even at a high temperature, and also is excellent in extrusion appearance can be produced with satisfactory productivity according to a specific production method in which a silane master batch prepared by melt-mixing a base resin containing chlorinated polyethylene and chloroprene rubber, an inorganic filler and a silane coupling agent at a specific ratio is mixed with a silanol condensation catalyst in a specific mixing aspect, according to a silane crosslinking method.

In addition, the present inventors found that a heat-resistant chlorine-containing crosslinked resin formed body that has reduced poor extrusion appearance, is hard to adhere to each other even if the bodies are brought into contact with each other in a stage in which a crosslinking reaction of a base resin does not sufficiently progress, and has no external damage or the like in appearance can be produced according to a specific production method in which a silane master batch prepared by melt-mixing a base resin containing chlorinated polyethylene and polyvinyl chloride, an inorganic filler and a silane coupling agent at a specific ratio is mixed with a silanol condensation catalyst in a specific mixing aspect, according to a silane crosslinking method.

The present inventors have further continued research based on these findings, and have completed the present invention.

The above-described problems of the present invention can be solved by the following means.

[1] A method for producing a heat-resistant chlorine-containing crosslinked resin formed body, comprising:

(a) a step of melt-mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene, at a temperature equal to or higher than a decomposition temperature of the organic peroxide, to prepare a silane master batch;

(b) a step of mixing the silane master batch obtained in the step (a) with a silanol condensation catalyst, and then forming the resultant mixture; and (c) a step of bringing the formed body obtained in the step (b) into contact with moisture, to cause crosslinking, wherein at least one of mixing of the melt-mixing in the step (a) and the mixing in the step (b) is performed in the coexistence of a chloroprene rubber or a polyvinyl chloride.

[2] A silane master batch for use in producing a master batch mixture prepared by mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene and either a chloroprene rubber or a polyvinyl chloride; and a silanol condensation catalyst, wherein the silane master batch is prepared by melt-mixing all or part of the base resin, the organic peroxide, the inorganic filler and the silane coupling agent, at a temperature equal to or higher than a decomposition temperature of the organic peroxide.

[3] A method for producing a heat-resistant chlorine-containing crosslinked resin formed body, comprising:

(a) a step of melt-mixing 0.003 to 0.2 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene, at a temperature equal to or higher than a decomposition temperature of the organic peroxide, to prepare a silane master batch;

(b) a step of mixing the silane master batch obtained in the step (a) with a silanol condensation catalyst, and then forming the resultant mixture; and (c) a step of bringing the formed body obtained in the step (b) into contact with moisture, to cause crosslinking, wherein at least one of mixing of the melt-mixing in the step (a) and the mixing in the step (b) is performed in the coexistence of a chloroprene rubber.

[4] The method for producing the heat-resistant chlorine-containing crosslinked resin formed body described in the item [1] or [3], wherein the mixing in the step (b) is performed in the coexistence of the chloroprene rubber.

[5] The method for producing the heat-resistant chlorine-containing crosslinked resin formed body described in any one of the items [1], and [3] to [4], wherein a content of the organic peroxide is 0.005 to 0.2 part by mass.

[6] The method for producing the heat-resistant chlorine-containing crosslinked resin formed body described in any one of the items [1], and [3] to [5], wherein a content of the silane coupling agent is 3 to 12.0 parts by mass.

[7] The method for producing the heat-resistant chlorine-containing crosslinked resin formed body described in any one of the items [1], and [3] to [6], wherein a content of the silane coupling agent is 4 to 12.0 parts by mass.

[8] The method for producing the heat-resistant chlorine-containing crosslinked resin formed body described in any one of the items [1], and [3] to [7], wherein the silane coupling agent is vinyltrimethoxysilane or vinyltriethoxysilane.

[9] The method for producing the heat-resistant chlorine-containing crosslinked resin formed body described in any one of the items [1], and [3] to [8], wherein the inorganic filler is silica, aluminum hydroxide, magnesium hydroxide or calcium carbonate, or any combination of these.

[10] The method for producing the heat-resistant chlorine-containing crosslinked resin formed body described in any one of the items [1], and [3] to [9], wherein the melt-mixing in the step (a) is performed by using an enclosed mixer.

[11] A silane master batch for use in producing a master batch mixture prepared by mixing 0.003 to 0.2 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene and a chloroprene rubber; and a silanol condensation catalyst,
wherein the silane master batch is prepared by melt-mixing all or part of the base resin, the organic peroxide, the inorganic filler and the silane coupling agent, at a temperature equal to or higher than a decomposition temperature of the organic peroxide.

[12] A master batch mixture, containing the silane master batch described in the item [2] or [11] and a silanol condensation catalyst.

[13] A formed body, formed by introducing a master batch mixture formed by dry-blending the silane master batch described in the item [2] or [11] and a silanol condensation catalyst into a forming machine.

[14] A heat-resistant chlorine-containing crosslinked resin formed body, produced according to the method for producing the heat-resistant chlorine-containing crosslinked resin formed body described in any one of the items [1], and [3] to [10].

[15] The heat-resistant chlorine-containing crosslinked resin formed body described in the item [14], formed by crosslinking the base resin with the inorganic filler through a silanol bond.

[16] A heat-resistant product, containing the heat-resistant chlorine-containing crosslinked resin formed body described in the item [14] or [15].

[17] The heat-resistant product described in the item [16], wherein the heat-resistant chlorine-containing crosslinked resin formed body is a coating of an electric wire or an optical fiber cable.

(Hereinafter, the method for producing the heat-resistant chlorine-containing crosslinked resin formed body, the silane master batch, the master batch mixture, the formed body, the heat-resistant chlorine-containing crosslinked resin formed body and the heat-resistant product described in the items [3] to [17] are collectively referred to as a first embodiment of the present invention.)

[18] A method for producing a heat-resistant chlorine-containing crosslinked resin formed body, comprising:
(a) a step of melt-mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene, at a temperature equal to or higher than a decomposition temperature of the organic peroxide, to prepare a silane master batch;
(b) a step of mixing the silane master batch obtained in the step (a) with a silanol condensation catalyst, and then forming the resultant mixture; and
(c) a step of bringing the formed body obtained in the step (b) into contact with moisture, to cause crosslinking,
wherein at least one of mixing of the melt-mixing in the step (a) and the mixing in the step (b) is performed in the coexistence of a polyvinyl chloride.

[19] The method for producing the heat-resistant chlorine-containing crosslinked resin formed body described in the item [1] or [18], wherein the melt-mixing in the step (a) is performed in the coexistence of a polyvinyl chloride.

[20] The method for producing the heat-resistant chlorine-containing crosslinked resin formed body described in any one of the items [1], and [18] to [19], wherein a percentage content of the polyvinyl chloride in the base resin is 5 to 50% by mass.

[21] The method for producing the heat-resistant chlorine-containing crosslinked resin formed body described in any one of the items [1], and [18] to [20], wherein a percentage content of the polyvinyl chloride in the base resin is 10 to 40% by mass.

[22] The method for producing the heat-resistant chlorine-containing crosslinked resin formed body described in any one of the items [1], and [18] to [21], wherein the base resin contains at least one of a plasticizer and an oil in a percentage content of 0 to 35% by mass in the base resin.

[23] The method for producing the heat-resistant chlorine-containing crosslinked resin formed body described in the item [22], wherein a percentage content of the plasticizer and the oil is equal to or less than a percentage content of the polyvinyl chloride.

[24] The method for producing the heat-resistant chlorine-containing crosslinked resin formed body described in any one of the items [1] and [18] to [23], wherein a content of the organic peroxide is 0.005 to 0.3 part by mass.

[25] The method for producing the heat-resistant chlorine-containing crosslinked resin formed body described in any one of the items [1] and [18] to [24], wherein a content of the silane coupling agent is 3 to 12.0 parts by mass.

[26] The method for producing the heat-resistant chlorine-containing crosslinked resin formed body described in any one of the items [1] and [18] to [25], wherein a content of the silane coupling agent is 4 to 12.0 parts by mass.

[27] The method for producing the heat-resistant chlorine-containing crosslinked resin formed body described in any one of the items [1] and [18] to [26], wherein the silane coupling agent is vinyltrimethoxysilane or vinyltriethoxysilane.

[28] The method for producing the heat-resistant chlorine-containing crosslinked resin formed body described in any one of the items [1] and [18] to [27], wherein the inorganic filler is silica, aluminum hydroxide, magnesium hydroxide, calcium carbonate, or any combination of these.

[29] The method for producing the heat-resistant chlorine-containing crosslinked resin formed body described in any one of the items [1] and [18] to [28], wherein the melt-kneading in the step (a) is performed by using an enclosed mixer.

[30] A silane master batch for use in producing a master batch mixture prepared by 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene and a polyvinyl chloride; and a silanol condensation catalyst;

wherein the silane master batch is prepared by melt-mixing all or part of the base resin; the organic peroxide, the inorganic filler and the silane coupling agent, at a temperature equal to or higher than a decomposition temperature of the organic peroxide.

[31] A master batch mixture, comprising the silane master batch described in the item [2] or [30] and a silanol condensation catalyst.

[32] A formed body, formed by introducing the master batch mixture obtained by dry-blending the silane master batch described in the item [2] or [30] and a silanol condensation catalyst, into a forming machine.

[33] A heat-resistant crosslinked resin formed body, produced according to the method for producing the heat-resistant chlorine-containing crosslinked resin formed body described in any one of the items [1] and [18] to [29].

[34] The heat-resistant chlorine-containing crosslinked resin formed body described in the item [33], formed by crosslinking the base resin with the inorganic filler through a silanol bond.

[35] A heat-resistant product, comprising the heat-resistant chlorine-containing crosslinked resin formed body described in the item [33] or [34].

[36] The heat-resistant product described in the item [35], wherein the heat-resistant chlorine-containing crosslinked resin formed body is a coating of an electric wire or an optical fiber cable.

(Hereinafter, the method for producing the heat-resistant chlorine-containing crosslinked resin formed body, the silane master batch, the master batch mixture, the formed body, the heat-resistant chlorine-containing crosslinked resin formed body and the heat-resistant product described in the items [18] to [36] are collectively referred to as a second embodiment of the present invention.)

Here, unless otherwise specified, the present invention means covering both of the first embodiment and the second embodiment. The description made without specifying the embodiment herein is applied to the description of an aspect common to both of the first embodiment and the second embodiment.

Note that, in this specification, numerical expressions in a style of "... to ..." will be used to indicate a range including the lower and upper limits represented by the numerals given before and after "to", respectively.

Effects of Invention

The present invention can overcome problems of the existing method described above, and can produce a heat-resistant chlorine-containing crosslinked resin formed body that is excellent in appearance and heat resistance, and a heat-resistant product containing the formed body, by mixing an inorganic filler and a silane coupling agent before kneading and/or during kneading with a base resin, thereby suppressing volatilization of the silane coupling agent during kneading. Further, even if a large amount of the inorganic filler is added thereto, a crosslinked resin formed body having high heat resistance can be produced without using special facilities for chemical crosslinking, electron beam crosslinking or the like.

The present invention, particularly, the first embodiment of the present invention can produce a heat-resistant chlorine-containing crosslinked resin formed body that is excellent in all of oil resistance, weather resistance, extrusion appearance and heat resistance, and is not melted even at a high temperature, and a heat-resistant product containing the formed body, by suppressing volatilization of the silane coupling agent during kneading and with satisfactory productivity, according to the above-mentioned method.

Accordingly, the present invention, particularly, the first embodiment of the present invention can provide a heat-resistant chlorine-containing crosslinked resin formed body that exhibits excellent oil resistance and weather resistance, is excellent in heat resistance, is not melted even at a high temperature, and also is excellent in extrusion appearance, and a method for producing the formed body.

In addition, the present invention particularly, the first embodiment of the present invention can provide a silane master batch or a master batch mixture capable of forming this heat-resistant chlorine-containing crosslinked resin formed body and a formed body thereof. Furthermore, the present invention particularly, the first embodiment of the present invention can provide a heat-resistant product containing the heat-resistant chlorine-containing crosslinked resin formed body.

In addition, the present invention, particularly, the second embodiment of the present invention can produce a heat-resistant chlorine-containing crosslinked resin formed body that has reduced poor extrusion appearance and appearance roughness and has excellent appearance as described above, and a heat-resistant product containing the formed body, by suppressing volatilization of a silane coupling agent during melt-mixing, according to the above-mentioned method.

The present invention, particularly, the second embodiment of the present invention can provide a heat-resistant chlorine-containing crosslinked resin formed body that has reduced poor extrusion appearance and appearance roughness as described above, and a method for producing the formed body. In addition, the present invention particularly, the second embodiment of the present invention can provide a silane master batch or a master batch mixture or a formed body thereof, capable of forming this heat-resistant chlorine-containing crosslinked resin formed body. Furthermore, the present invention particularly, the second embodiment of the present invention can provide a heat-resistant product containing the heat-resistant chlorine-containing crosslinked resin formed body.

Other and further features and advantages of the invention will appear more fully from the following description.

MODE FOR CARRYING OUT THE INVENTION

A production method of the present invention is a method for obtaining a heat-resistant chlorine-containing crosslinked resin formed body, by using a base resin containing chlorinated polyethylene, according to a silane crosslinking method. The production method of the present invention has steps (a) to (c) described later, in which at least one of mixing of the melt-mixing in the step (a) and the mixing in the step (b) is performed in the coexistence of a chloroprene rubber or a polyvinyl chloride.

A preferred embodiment of the method for producing the heat-resistant chlorine-containing crosslinked resin formed body of the present invention can be classified into a first embodiment in which the above-described mixing is performed in the presence of the above-described chloroprene rubber, and a second embodiment in which the above-described mixing is performed in the presence of the above-described polyvinyl chloride.

First, each component used in the present invention will be described.

<Base Resin>

A base resin used in the present invention contains a chlorinated polyethylene and either a chloroprene rubber or a polyvinyl chloride, among chlorine-containing resins.

The base resin used in the first embodiment will be described.

The base resin for use in the first embodiment contains a chlorinated polyethylene and a chloroprene rubber among the chlorine-containing resins. If a chlorinated polyethylene and a chloroprene rubber are incorporated thereinto as the base resin, the heat-resistant chlorine-containing crosslinked resin formed body can be provided with excellent oil resistance and weather resistance in addition to heat resistance and extrusion appearance.

Chlorinated polyethylene is not particularly limited, as long as the chlorinated polyethylene is polyethylene in which a hydrogen atom bonded to a polyethylene main chain is replaced by a chlorine atom, and specific examples thereof include one obtained by chlorinating an ethylene (co)polymer. As the chlorinated polyethylene, one having a chlorine content of 20% by mass or more is preferable, one having a chlorine content of 25% by mass or more is more preferable, and one having a chlorine content of 30% by mass or more is further preferable. As the chlorine content is larger, the formed body superb in oil resistance and weather resistance and also superb in rubber elasticity can be obtained. An upper limit of a chlorine percentage content is a mass ratio when all of hydrogen atoms of polyethylene before being chlorinated, and capable of being replaced by a chlorine atom are replaced by the chlorine atom, and is unable to be unambiguously determined by a molecular weight of polyethylene before being chlorinated, the number of hydrogen atoms capable of being replaced by the chlorine atom, or the like. For example, the upper limit is about 75% by mass. The chlorine content means a mass ratio of the chlorine atom to a total amount of chlorinated polyethylene, and can be quantitatively determined according to potentiometric titration described in JIS K 7229.

Chloroprene rubber is not particularly limited, as long as the chloroprene rubber is a rubber of chloroprene polymer (homopolymer or copolymer).

In the first embodiment, if chloroprene rubber is used as the base resin in addition to chlorinated polyethylene, oil resistance and weather resistance can be reinforced and also elasticity and heat deformation properties (heat resistance) of the formed body can be further improved. In particular, such use exhibits a high effect on improving productivity of the heat-resistant chlorine-containing crosslinked resin formed body. That is, a time of silane crosslinking (silanol condensation reaction) required for obtaining the formed body exhibiting predetermined heat resistance can be significantly reduced in comparison with a case where chlorinated polyethylene is used alone. Therefore, a silane crosslinking time when an extrusion-formed non-crosslinked formed body is silane-crosslinked by being left to stand at room temperature or at a high temperature and high humidity can be significantly reduced. In addition, silane crosslinking conditions can also be further relaxed.

In the first embodiment, the base resin may further contain any other resin, an oil component or a plasticizer.

Any other resin is not particularly limited, and specific examples thereof include a resin of a polymer having a site capable of a grafting reaction with a grafting reaction site of a silane coupling agent in the presence of organic peroxide, for example, an unsaturated bond site of a carbon chain, or a carbon atom having a hydrogen atom in a main chain or at a terminal thereof. Specific examples thereof include a thermoplastic elastomer, a resin of an ethylenic copolymer, modified polyethylene, a polyolefin resin, polyester and various rubbers.

In addition, specific examples of any other resin also include a chlorine-containing resin (resin specified in JIS K 7229-1995) other than chlorinated polyethylene and chloroprene rubber, or a fluorine-containing resin such as fluorocarbon rubber. That is, in the first embodiment, the base resin include an aspect containing at least one of a chlorine-containing resin other than chlorinated polyethylene and other than chloroprene rubber, and a fluorine-containing resin, and an aspect without containing the chlorine-containing resin and the fluorine-containing resin as described above.

The thermoplastic elastomer is not particularly limited, and specific examples thereof include a polyester-based elastomer, a styrene-based elastomer, a polyurethane elastomer, an olefin-based elastomer and a polyamide elastomer. In the present invention, the base resin includes an aspect without containing the thermoplastic elastomer, and an aspect containing the thermoplastic elastomer.

The resin of the ethylenic copolymer is not particularly limited, and specific examples thereof include an ethylene-α-olefin copolymer and a polyolefin copolymer having an acid copolymerization component or an acid ester copolymerization component. Specific examples thereof include an ethylene-vinylacetate copolymer, an ethylene-(meth) acrylic acid copolymer and an ethylene-alkyl (meth)acrylate copolymer.

The modified polyethylene is not particularly limited, as long as the modified polyethylene is other than chlorinated polyethylene, and for example, the modified polyethylene only needs to be one prepared by modifying the resin of the above-described ethylenic copolymer. Specific examples thereof include a resin of an ethylene-vinylacetate copolymer modified with polyorganosiloxane, a polyolefin resin modified with unsaturated carboxylic acid, a resin of an ethylene-vinylacetate copolymer modified with unsaturated carboxylic acid, and a resin of an ethylene-(meth)acrylate copolymer modified with unsaturated carboxylic acid.

The polyolefin resin is not particularly limited, as long as the polyolefin resin is a resin of a polymer obtained by polymerizing or copolymerizing a compound having an ethylenic unsaturated bond, and a polymer other than the ethylenic copolymer and the modified polyethylene as described above, and a resin that has been used so far for a heat-resistant resin composition can be used. Specific examples thereof include polyethylene and polypropylene.

Specific examples of the rubber include ethylene rubber, acrylic rubber, nitrile rubber and styrene rubber. Specific examples of the ethylene rubber include ethylene-propylene rubber, ethylene-butene rubber, ethylene-octene rubber, ethylene-propylene-diene rubber and ethylene-butene-diene rubber.

The oil component is not particularly limited, and specific examples thereof include organic oil or mineral oil Specific examples of the organic oil or the mineral oil include soybean oil, paraffin oil and naphthene oil.

The plasticizer is not particularly limited, and specific examples thereof include various agents ordinarily used in chlorinated polyethylenes and chloroprene rubbers. Specific examples thereof include trialkyl trimellitate (C8, C10), a pyromellitic acid ester-based plasticizer, a phthalic acid ester-based plasticizer, an adipic acid ester plasticizer and a polyester-based plasticizer.

In the base resin for use in the first embodiment, a percentage content of each component is appropriately determined to be 100% by mass in a total amount of each component contained in the base resin, such as chlorinated polyethylene and chloroprene rubber, and any other resin, the oil component and the plasticizer, to be incorporated thereinto, when necessary, and the percentage content is preferably selected from within the following range.

A percentage content of chlorinated polyethylene in the base resin used in the first embodiment is not particularly limited, and is preferably 30 to 95% by mass, more preferably 35 to 85% by mass, and further preferably 45 to 85% by mass. If this percentage content is excessively small, the product is unable to be provided with flame retardancy, oil resistance, weather resistance and the like inherent to chlorinated polyethylene in several cases. In addition, if the content is excessively large, crosslinking becomes hard to be caused, and heat resistance is liable to be adversely affected.

A percentage content of chloroprene rubber in the base resin used in the first embodiment is not particularly limited, and is preferably 3 to 50% by mass, more preferably 5 to 45% by mass, and further preferably 7 to 40% by mass, in 100% by mass of resin components. If this percentage content is excessively small, an effect of simultaneously using chloroprene rubber is substantially lost, and if this percentage content is excessively large, while heat deformation properties and rubber elasticity are improved, poor extrusion appearance is caused in several cases.

A content of any other resin in the base resin used in the first embodiment is not particularly limited, and is preferably 0 to 45% by mass, and more preferably 0 to 25% by mass.

A percentage content of oil in the base resin used in the first embodiment is not particularly limited, and when the base resin contains the oil, the percentage content thereof is preferably 0 to 75% by mass, and more preferably 0 to 60% by mass, in 100% by mass of the base resin. If the content of oil is excessively large, oil causes bleeding or strength is reduced in several cases.

A percentage content of the plasticizer in the base resin for use in the first embodiment is not particularly limited, and when the resin contains the plasticizer, the percentage content of the plasticizer is preferably 0 to 75% by mass, and more preferably 0 to 60% by mass, in 100% by mass of the base resin. If the content of the plasticizer is excessively large, it can be a cause of bleeding and reduction of strength.

Next, the base resin used in the second embodiment will be described.

The base resin for use in the second embodiment includes a chlorinated polyethylene and a polyvinyl chloride among the chlorine-containing resins. If a chlorinated polyethylene and a polyvinyl chloride are contained as the base resin, the heat-resistant chlorine-containing crosslinked resin formed body can be provided with high heat resistance and excellent appearance, and can also be further provided with excellent oil resistance and weather resistance.

Chlorinated polyethylene has the same meaning as chlorinated polyethylene used in the first embodiment, and a preferred range is also the same.

Polyvinyl chloride is not particularly limited, as long as the polyvinyl chloride is a polymer (homopolymer or copolymer) of vinyl chloride.

In the second embodiment, if polyvinyl chloride is used as the base resin in addition to chlorinated polyethylene, adhesiveness (tackiness) on a surface of a (non-crosslinked) formed body after forming can be reduced. In particular, such use exhibits a high effect on improving productivity of the heat-resistant chlorine-containing crosslinked resin formed body. In addition, even if a content of the silane coupling agent is increased, extrusion appearance characteristics of the heat-resistant chlorine-containing crosslinked resin formed body can be improved. Therefore, the heat-resistant chlorine-containing crosslinked resin formed body having satisfactory appearance can be obtained.

If polyvinyl chloride is used as the base resin, strength of the heat-resistant chlorine-containing crosslinked resin formed body can also be further improved.

A molecular weight of polyvinyl chloride is preferably 400 to 3000, and more preferably 700 to 2600. If the molecular weight is within the above-described range, appearance during forming becomes satisfactory, and the heat-resistant chlorine-containing crosslinked resin formed body can be provided with excellent oil resistance or high strength.

In the second embodiment, the base resin may further contain at least one kind of plasticizer and oil as a plasticizer component.

The oil is not particularly limited, and specific examples thereof include organic oil or mineral oil. Specific examples thereof include soybean oil, paraffin oil, naphthene oil and aroma oil. Among them, soybean oil, paraffin oil or naphthene oil is preferable.

Specific examples of the plasticizer include various agents ordinarily used in polyvinyl chloride. Specific examples thereof include trialkyl trimellitate (C8, C10), a pyromellitic acid ester-based plasticizer, a phthalic acid ester-based plasticizer, an adipic acid ester plasticizer and a polyester-based plasticizer.

In the second embodiment, the base resin may further contain any other resin.

Any other resin in the second embodiment has the same meaning as any other resin in the first embodiment except that a chlorine-containing resin (for example, chloroprene rubber) other than chlorinated polyethylene and polyvinyl chloride can be used. In addition, the preferred range is the same with the preferred range in the first embodiment except that a kind of rubber is not particularly limited.

In the base resin used in the second embodiment, a percentage content of each component is appropriately determined to be 100% by mass in a total amount of each component to be contained in the base resin, including the chlorinated polyethylene and the polyvinyl chloride, and the plasticize component and any other resin to be incorporated thereinto, when necessary, and is preferably selected from within the following range.

A percentage content of chlorinated polyethylene in the base resin used in the second embodiment is not particularly limited, and is preferably 30 to 95% by mass, more preferably 35 to 85% by mass, and further preferably 45 to 85% by mass. If the percentage content of chlorinated polyethylene is within the range of 30 to 95% by mass, the product having excellent heat resistance and appearance is provided. In addition, the product can be provided with flame retardancy and oil resistance inherent to chlorinated polyethylene.

A percentage content of polyvinyl chloride in the base resin used in the second embodiment is not particularly limited, and is preferably 3 to 60% by mass, more preferably 5 to 50% by mass, and further preferably 10 to 40% by mass. If the percentage content of polyvinyl chloride becomes smaller than 3%, a substantial effect tends to be reduced, and if the percentage content is more than 60%, heat resistance tends to be deteriorated. In particular, if the percentage content is within the range of 5 to 50% by mass, the product having excellent heat resistance, oil resistance and appearance is provided.

A percentage content (total percentage content in the case of containing two or more kinds) of the plasticizer and the oil in the base resin used in the second embodiment is not particularly limited, and is preferably equal to or less than the percentage content of polyvinyl chloride. This percentage content is preferably 0 to 35% by mass, more preferably 2 to 30% by mass, and particularly preferably 5 to 20% by mass. If the percentage content of the plasticizer component is excessively large, strength of the heat-resistant chlorine-containing crosslinked resin formed body tends to be reduced.

A percentage content of any other resin in the base resin used in the second embodiment is not particularly limited, and is preferably 0 to 45% by mass, and more preferably 0 to 25% by mass.

<Organic Peroxide>

The organic peroxide plays a role of generating a radical at least by thermal decomposition, to cause a grafting reaction due to the radical reaction of the silane coupling agent onto the resin component, as a catalyst. In particular, when the reaction site of the silane coupling agent contains, for example, an ethylenically unsaturated group, the organic peroxide play a role of causing the grafting reaction due to a radical reaction (including an abstraction reaction of a hydrogen radical from the resin component) between the ethylenically unsaturated group and the resin component.

The organic peroxide is not particularly limited, as long as the organic peroxide is one that generates a radical. For example, as the organic peroxide, the compound represented by the formula $R^1$—OO—$R^2$, $R^3$—OO—C(=O)$R^4$, or $R^5$C(=O)—OO(C=O)$R^6$ is preferable. Herein, $R^1$ to $R^6$ each independently represent an alkyl group, an aryl group, or an acyl group. Among $R^1$ to $R^6$ of each compound, it is preferable that all of $R^1$ to $R^6$ be an alkyl group, or any one of them be an alkyl group, and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexyne-3,1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butyl-cumyl peroxide and the like. Among them, dicumyl peroxide, 2,5-dimethyl-2,5-di-(tert-butyl peroxy)hexane, or 2,5-dimethyl-2,5-di-(tert-butyl peroxy)hexyne-3 is preferable, from the standpoint of odor, coloration, and scorch stability.

The decomposition temperature of the organic peroxide is preferably 80 to 195° C., and more preferably 125 to 180° C.

For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or heat generation starts, when the organic peroxide is heated from a room temperature in a heating rate of 5° C./min under a nitrogen gas atmosphere, by a thermal analysis such as a DSC method.

<Inorganic Filler>

In the present invention, the inorganic filler can be used without particular limitation, as long as the inorganic filler has, on a surface thereof, a site with which the inorganic filler can be chemically bonded to a reaction site, such as a silanol group or the like, of the silane coupling agent, by hydrogen bonding, covalent bonding or the like, or intermolecular bonding. For the inorganic filler, examples of the site that can be chemically bonded with the reaction site of the silane coupling agent may include an OH group (OH group of hydroxy group, of water molecule in hydrous substance or crystallized water, or of carboxyl group), amino group, a SH group, and the like.

As such an inorganic filler, though not limited to these, use can be made of metal hydrate, such as a compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, hydrotalcite, and talc. Further, use can be made of boron nitride, silica (crystalline silica, amorphous silica, and the like), carbon, clay, zinc oxide, tin oxide, titanium oxide, molybdenum oxide, antimony trioxide, a silicone compound, quartz, zinc borate, white carbon, zinc borate, zinc hydroxystannate, or zinc stannate.

As the inorganic filler, a surface-treated inorganic filler, surface-treated with a silane coupling agent or the like can be used. Specific examples of silane-coupling-agent-surface-treated inorganic filler include KISUMA 5L and KISUMA 5P (both trade names, magnesium hydroxide, manufactured by Kyowa Chemical Industry Co., Ltd.) or the like. The amount of surface treatment of the inorganic filler with a silane coupling agent is not particularly limited, but is 3 mass % or less, for example.

Among these inorganic fillers, silica, aluminum hydroxide, magnesium hydroxide, or calcium carbonate, or any combination of these is preferable.

The inorganic filler may be used singly alone, or in combination of two or more kinds thereof.

When the inorganic fillers is in a powder form, the inorganic filler has an average particle diameter of preferably 0.2 to 10 μm, more preferably 0.3 to 8 μm, further preferably 0.4 to 5 μm, and particularly preferably 0.4 to 3 μm. If the average particle diameter is within the above-described range, a silane coupling agent holding effect is high, to provide the product having excellent heat resistance. In addition, the inorganic filler is hard to cause secondary aggregation during mixing with the silane coupling agent, to provide the product having excellent extrusion appearance. The average particle diameter is obtained by dispersing the inorganic filler in alcohol or water, and then measuring using an optical particle diameter measuring device such as a laser diffraction/scattering particle diameter distribution measuring device.

<Silane Coupling Agent>

The silane coupling agent to be used in the present invention may be an agent at least having a grafting reaction site (a group or an atom) having a capability of being graft reacted onto the base resin, especially the chlorine-containing resin, in the presence of a radical generated by decomposition of the organic peroxide, and a reaction site (including a moiety formed by hydrolysis: for example, a silyl ester group or the like) having both a capability of being silanol condensed, and a capability of reacting with the site having a capability of being chemically bonded in the inorganic filler. Specific examples of such a silane coupling agent include a silane coupling agent that has been used so far in the silane crosslinking method.

As such a silane coupling agent, for example, a compound represented by the following Formula (1) can be used.

Formula (1)

In formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$, and $Y^{13}$ each represent a hydrolyzable organic group. $Y^{11}$, $Y^{12}$, and $Y^{13}$ may be the same or different from each other.

$R_{a11}$ is a grafting reaction site, and is preferably a group containing an ethylenically unsaturated group. Specific examples of the group containing the ethylenically unsaturated group include a vinyl group, a (meth)acryloyloxyalkylene group and a p-styryl group. Among them, a vinyl group is preferable.

$R_{b11}$ represents an aliphatic hydrocarbon group, a hydrogen atom, or $Y^{13}$ to be described below, and example of the aliphatic hydrocarbon group may include a monovalent aliphatic hydrocarbon group having 1 to 8 carbon atoms other than an aliphatic unsaturated hydrocarbon group. $R_{b11}$ preferably represents $Y^{13}$ to be described below.

$Y^{11}$, $Y^{12}$, and $Y^{13}$ each independently represent a reaction site capable of silanol condensation (a hydrolyzable organic group). Examples thereof may include an alkoxy group having 1 to 6 carbon atoms, an aryloxy group having 6 to 10 carbon atoms, and an acyloxy group having 1 to 4 carbon atoms, and an alkoxy group is preferable. Specific examples of the hydrolyzable organic group may include methoxy, ethoxy, butoxy, and acyloxy. Among them, from the standpoint of the reactivity of the silane coupling agent, methoxy or ethoxy is preferable.

As the silane coupling agent, a silane coupling agent that has high hydrolysis rate is preferable, a silane coupling agent in which $R_{b11}$ is $Y^{13}$ and also $Y^{11}$, $Y^{12}$, and $Y^{13}$ are the same each other, or a silane coupling agent in which at least one of $Y^{11}$, $Y^{12}$, and $Y^{13}$ is a methoxy group, is more preferable.

Specific examples of the silane coupling agent include vinylsilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, and vinyltriacetoxysilane, and (meth)acryloxysilanes such as methacryloxypropyltrimethoxysilane, methacryloxypropyltriethoxysilane, and methacryloxypropylmethyldimethoxysilane.

Among the silane coupling agents, the silane coupling agent having a vinyl group and an alkoxy group at an end is more preferable, and vinyltrimethoxysilane or vinyltriethoxysilane is particularly preferable.

The silane coupling agent may be used singly, or in combination of two or more kinds thereof. Further, the silane coupling agent may be used as it is, or may be diluted with a solvent and used.

<Silanol Condensation Catalyst>

The silanol condensation catalyst has an action of binding the silane coupling agents which have been grafted onto the base resin to each other, by a condensation reaction, in the presence of water. Based on the action of the silanol condensation catalyst, the base resin are crosslinked between themselves through silane coupling agent. As a result, the heat-resistant chlorine-containing crosslinked resin formed body having excellent heat resistance can be obtained.

Examples of the silanol condensation catalyst to be used in the present invention include an organic tin compound, a metal soap, a platinum compound, and the like. Usual examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like. Among these, organic tin compounds such as dibutyltin dilaurate, dioctyltin dilaurate, dibutyltin dioctylate, and dibutyltin diacetate are particularly preferable.

<Carrier Resin>

A silanol condensation catalyst is used, if desired, in a form mixed with a resin. Such a resin (also referred to as a carrier resin) is not particularly limited, and each resin component or rubber component described in the base resin can be used.

In the first embodiment, the carrier resin preferably contains chloroprene rubber. If the carrier resin contains chloroprene rubber, the heat-resistant chlorine-containing crosslinked resin formed body that is excellent in rubber elasticity and heat deformation properties and also has satisfactory extrusion appearance can be produced with satisfactory productivity. In addition, the heat deformation properties are further improved, and simultaneously a crosslinking time in being left to stand or exposed to a high temperature and high humidity can be shortened without causing poor appearance.

In the second embodiment, the carrier resin may contain polyvinyl chloride.

The carrier resin preferably contains one kind or two or more kinds of resin components used in the silane master batch, in considering compatibility with the silane master batch.

<Additive>

To the heat-resistant chlorine-containing crosslinked resin formed body and the like, various additives which are usually used for electric wires, electric cables, electric cords, sheets, foams, tubes, and pipes, may be properly used in the range that does not adversely affect the effects exhibited by the present invention. Examples of these additives include a crosslinking assistant, an antioxidant, a lubricant, a metal inactivator, a filling agent (including a flame retardant and a flame retardant aid), and the like.

The crosslinking assistant refers to one that forms a partial crosslinking structure with the base resin component, in the presence of the organic peroxide. Examples thereof may include polyfunctional compounds, for example, a (meth)acrylate compound such as polypropyleneglycol diacrylate and trimethylolpropane triacrylate, an allyl compound such as triallyl cyanurate; a maleimide compound, or a divinyl compound.

The antioxidant is not particularly limited, but, for example, an amine-based antioxidant, a phenol-based antioxidant, sulfur-based antioxidant, and the like can be used. Examples of the amine-based antioxidant include 4,4'-dioctyl-diphenylamine, N,N'-diphenyl-p-phenylenediamine, 2,2,4-trirnethyl-1,2-dihydroquinoline polymer; and the like. Examples of the phenol-based antioxidant include pentaerythritol-tetrakis(3-(3,5-di-tert-butyl-4-hydroxyphenyl)propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene; and the like. Examples of the sulfur-based antioxidant include bis(2-methyl-4-(3-n-alkyl-thiopropionyloxy)-5-tert-butylphenyl)sulfide, 2-mercaptobenzimidazole and zinc salts thereof, and pentaerythritol-tetrakis(3-lauryl-thiopropionate). The antioxidant is preferably included in a content of 0.1 to 15.0 parts by mass, and more preferably included in a content of 0.1 to 10 parts by mass, with respect to 100 parts by mass of the base resin.

Examples of the metal inactivator may include N,N'-bis(3-(3,5-di-tert-butyl-4-hydroxyphenyl)propionyl)hydrazine, 3-(N-salicyloyl)amino-1,2,4-triazole, and 2,2'-oxamidebis(ethyl-3-(3,5-di-tert-butyl-4-hydroxyphenyl)propionate).

Specific examples of the flame retardant (flame retardant aid) or the filler include carbon, clay, zinc oxide, tin oxide, titanium oxide, magnesium oxide, molybdenum oxide, antimony trioxide, a silicone compound, quartz, talc, calcium carbonate, magnesium carbonate, zinc borate and white carbon. These filling agents may be used as the filler, in mixing the silane coupling agent, or may be added to the carrier resin.

Examples of the lubricant may include hydrocarbon-based, siloxane-based, fatty-acid-based, fatty-acid-amide-based, ester-based, alcohol-based, or metal-soap-based lubricants. These lubricants should be added to the carrier resin.

Next, the production method of the present invention is specifically described.

In the method for producing the heat-resistant chlorine-containing crosslinked resin formed body of the present invention, the following step (a) to step (c) are performed.

The silane master batch of the present invention is produced through the following step (a), and the master batch mixture of the present invention is produced through the following step (a) and step (b).

Step (a): a step of melt-kneading 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene, at a temperature equal to or higher than a decomposition temperature of the organic peroxide, to prepare a silane master batch;

Step (b): a step of mixing the silane master batch obtained in the step (a) with a silanol condensation catalyst, and then forming the resultant mixture; and Step (c): a step of bringing the formed body obtained in the step (b) into contact with moisture, to cause crosslinking.

In the steps (a) and (b) described above, at least one of mixing of the melt-mixing in the step (a) and the mixing in the step (b) is performed in the coexistence of a chloroprene rubber or a polyvinyl chloride.

Here, a term "mixing" means obtaining of a uniform mixture.

In a method for producing a heat-resistant chlorine-containing crosslinked resin formed body according to the first embodiment, the following steps (a) to (c) are performed.

A silane master batch according to the first embodiment is produced according to the following step (a), and a master batch mixture according to the first embodiment is produced according to the following steps (a) and (b).

Step (a): a step of melt-mixing 0.003 to 0.2 part by mass of an organic peroxides, 0.5 to 400 parts by mass of an inorganic filler, and more than 2 parts by mass and 15.0 parts by mass or less of a silane coupling agent, with respect to 100 parts by mass of a base resin containing chlorinated polyethylene, at a temperature equal to or higher than a decomposition temperature of the organic peroxide, to prepare a silane master batch.

Step (b): a step of mixing the silane master batch obtained in the step (a) with a silanol condensation catalyst, and then forming the resultant mixture.

Step (c): a step of bringing the formed body obtained in the step (b) into contact with moisture, to cause crosslinking.

In the steps (a) and (b) described above, at least one of mixing of the melt-mixing in the step (a) and the mixing in the step (b) is performed in the coexistence of a chloroprene rubber. Mixing at least in the step (b) is preferably performed in the coexistence of a chloroprene rubber. That is, specific examples thereof include a method of using a chlorinated polyethylene and a chloroprene used as a base resin in the step (a), and using a chlorinated polyethylene and a chloroprene as a carrier resin in the step (b); or a method of using a chlorinated polyethylene as a base resin, and using a chloroprene as a carrier resin in the step (b); or a method of using a chlorinated polyethylene as a base resin in the step (a), and using a chlorinated polyethylene and a chloroprene as a carrier resin in the step (b).

In a method for producing a heat-resistant chlorine-containing crosslinked resin formed body according to the second embodiment, the following steps (a) to (c) are performed.

A silane master batch according to the second embodiment is produced according to the following step (a), and a master batch mixture according to the present invention is produced according to the following steps (a) and (b).

Step (a): a step of melt-mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene, at a temperature equal to or higher than a decomposition temperature of the organic peroxide to prepare a silane master batch.

Step (b): a step of mixing the silane master batch obtained in the step (a) with a silanol condensation catalyst, and then forming the resultant mixture.

Step (c): a step of bringing the formed body obtained in the step (b) into contact with moisture, to cause crosslinking.

In the steps (a) and (b) describe above, at least one of mixing of the melt-mixing in the step (a) and the mixing in the step (b) is performed in the coexistence of polyvinyl chloride. Mixing at least in the step (a) is preferably performed in the coexistence of polyvinyl chloride. That is, specific examples thereof include a method of using a chlorinated polyethylene and a polyvinyl chloride as a base resin in the step (a), and using a chlorinated polyethylene or a polyvinyl chloride as a carrier resin in the step (b); or a method of using a chlorinated polyethylene and a polyvinyl chloride as a base resin in the step (a), and using a chlorinated polyethylene and a polyvinyl chloride as a carrier resin in the step (b); or a method of using a chlorinated polyethylene as a base resin in the step (a), and using a polyvinyl chloride as a carrier resin in the step (b); or a method of using a chlorinated polyethylene as a base resin in the step (a), and using a chlorinated polyethylene and a polyvinyl chloride as a carrier resin in the step (b).

In the step (a) according to the present invention and preferably the second embodiment, a blending amount of the organic peroxide is 0.003 to 0.3 part by mass, preferably 0.005 to 0.3 part by mass, and more preferably 0.005 to 0.1 part by mass, with respect to 100 parts by mass of the base resin. In addition, in the step (a) according to the first embodiment, a blending amount of the organic peroxide is 0.003 to 0.2 part by mass, preferably 0.005 to 0.2 part by mass, and more preferably 0.005 to 0.1 part by mass, with respect to 100 parts by mass of the base resin. If the blending amount of the organic peroxide is less than 0.003 part by mass, the grafting reaction does not progress, and unreacted silane coupling agents cause condensation with each other or unreacted silane coupling agent is volatilized, and sufficient heat resistance is unable to be obtained in several cases. On the other hand, if the blending amount thereof is over 0.3 part by mass (for the first embodiment, over 0.2 part by mass), most of the resin components are directly crosslinked by a side reaction, to form aggregated substances, to cause poor extrusion appearance in several cases. In addition, the silane master batch or the like that is excellent in extrudability is unable to be obtained in several cases. That is, the grafting reaction can be performed in a suitable range by adjusting the blending amount of the organic peroxide within this range. Thus, the silane master batch or the like that is excellent in extrudability without generating a gel-like aggregated substance (aggregate) can be obtained.

The blending amount of the inorganic filler is 0.5 to 400 parts by mass, and preferably 30 to 280 parts by mass, with respect to 100 parts by mass of the base resin. If the blending amount of the inorganic filler is less than 0.5 part by mass, the grafting reaction of the silane coupling agent becomes nonuniform, and the heat-resistant chlorine-containing crosslinked resin formed body is unable to be provided with excellent heat resistance in several cases. In addition, the grafting reaction of the silane coupling agent becomes nonuniform, and the extrusion appearance of the heat-resistant chlorine-containing crosslinked resin formed body is deteriorated in several cases. On the other hand, if the blending amount is over 400 parts by mass, a load during forming or kneading is significantly increased, and secondary forming becomes difficult in several cases. In addition, the heat resistance or the extrusion appearance is deteriorated in several cases.

The blending amount of the silane coupling agent is more than 2.0 parts by mass and 15.0 parts by mass or less, with respect to 100 parts by mass of the base resin. If the blending amount of the silane coupling agent is 2.0 parts by mass or less, the crosslinking reaction does not progress sufficiently, and the excellent heat resistance is not exhibited in several cases. In addition, in forming together with the silanol condensation catalyst, poor extrusion appearance or the aggregated substance is generated, and when an extruder is stopped, a large number of aggregated substances are generated, in several cases. On the other hand, if the blending amount is over 15.0 parts by mass, the silane coupling agent is unable to be farther adsorbed on the inorganic filler surfaces, and the silane coupling agent is volatilized during melt-mixing, and such a case is not economical. In addition, the silane coupling agent that is not adsorbed causes condensation, and a crosslinked gel or aggregated substance or a burn is generated in the formed body, and the extrusion appearance is liable to be deteriorated.

From the above-described viewpoints, the blending amount of the silane coupling agent is preferably 3 to 12.0 parts by mass, and more preferably 4 to 12.0 parts by mass, with respect to 100 parts by mass of the base resin.

The blending amount of the silanol condensation catalyst is not particularly limited, and is preferably 0.0001 to 0.5 part by mass, and more preferably 0.001 to 0.2 part by mass, with respect to 100 parts by mass of the base resin. If the blending amount of the silanol condensation catalyst is within the above-mentioned range, the crosslinking reaction by the condensation reaction of the silane coupling agent easily progresses substantially uniformly, and the heat resistance, the extrusion appearance and physical properties of the heat-resistant chlorine-containing crosslinked resin formed body are excellent, and productivity thereof is also improved. That is, if the blending amount of the silanol condensation catalyst is excessively small, the crosslinking by the condensation reaction of the silane coupling agent becomes hard to progress, and the heat resistance of the heat-resistant chlorine-containing crosslinked resin formed body is hard to be improved and the productivity is reduced, or the crosslinking becomes nonuniform, in several cases. On the other hand, if the blending amount is excessively large, the silanol condensation reaction progresses significantly rapidly, and partial gelation is caused, and the extrusion appearance is deteriorated in several cases. In addition, the physical properties of the heat-resistant chlorine-containing crosslinked resin formed body (resin) are reduced in several cases.

In the present invention, an expression "melt-mixing the base resin, the organic peroxide, the inorganic filler and the silane coupling agent" does not specify the mixing order in melt-mixing, and means that such materials may be mixed in any order. The mixing order in the step (a) is not particularly limited. In the present invention, the inorganic filler is preferably mixed with the silane coupling agent and used. That is, in the present invention, each component described above is preferably (melt-)mixed through the following steps (a-1) and (a-2).

Step (a-1): a step of mixing at least the inorganic filler and the silane coupling agent, to prepare a mixture.

Step (a-2): a step of melt-mixing the mixture obtained in the step (a-1) with all or part of the base resin, in the presence of the organic peroxide, at a temperature equal to or higher than a decomposition temperature of the organic peroxide.

In the above-described step (a-2), the present invention includes "an aspect in which a total amount (100 parts by mass) of the base resin is blended" and "an aspect in which part of the base resin is blended". When part of the base resin is blended in the step (a-2), a remainder of the base resin is preferably blended in the step (b).

When part of the base resin is blended in the step (a-2), 100 parts by mass in the blending amount of the base resin in the step (a) and the step (b) are a total amount of the base resin to be mixed in the step (a-2) and the step (b).

Here, when the remainder of the base resin is blended in the step (b), the base resin is blended preferably in an amount of 55 to 99% by mass, and more preferably in an amount of 60 to 95% by mass in the step (a-2), and is blended preferably in an amount of 1 to 45% by mass, and more preferably in an amount of 5 to 40% by mass in the step (b).

In the present invention, as described above, the silane coupling agent is preferably pre-mixed or the like with the inorganic filler (step (a-1)).

The method of mixing the inorganic filler and the silane coupling agent is not particularly limited, and mixing methods such as wet treatment and dry treatment can be mentioned. Specific examples thereof include wet treatment in which a silane coupling agent is added in a solvent such as alcohol and water in a state in which an inorganic filler is dispersed, dry treatment in which the silane coupling agent is added and mixed, under heating or non-heating, to an untreated inorganic filler or to an inorganic filler preliminary subjected to surface treatment with stearic acid, oleic acid, phosphate or partially with the silane coupling agent, and both of these treatments. In the present invention, a dry treatment is preferable in which the silane coupling agent is added to the inorganic filler, preferably a dried inorganic filler, and mixed under heating or non-heating.

The pre-mixed silane coupling agent exists in such a manner of surrounding the surface of the inorganic filler, and a part or a whole thereof is adsorbed or bonded on the inorganic filler. In this manner, it becomes possible to suppress the volatilization of the silane coupling agent in the subsequent melt-mixing. Further, it is also possible to prevent the condensation among the silane coupling agents that are not adsorbed or bonded on the inorganic fillers, which makes melt-blending difficult. Furthermore, a desired shape can be obtained upon extrusion forming.

Specific examples of such a mixing method include a method in which an inorganic filler and a silane coupling agent are preferably mixed (dispersed) according to a dry method or a wet method at a temperature lower than a decomposition temperature of the organic peroxide, preferably at room temperature (25° C.), for about several minutes to several hours, and then this mixture and the resin are melt-mixed in the presence of the organic peroxide. This mixing is preferably performed by a mixer type mixing machine such as a Banbury mixer and a kneader. In this manner, an excessive crosslinking reaction between the resin components can be prevented, to provide the product having excellent extrusion appearance.

In this mixing method, the resin may exist as long as the above-described temperature lower than the decomposition temperature is kept. In this case, it is preferable to mix metal oxide and the silane coupling agent together with the resin at the above-described temperature (step (a-1)), and then melt-mix the resultant material.

A method of mixing the organic peroxide is not particularly limited, and the organic peroxide only needs to exist in melt-mixing the above-described mixture and the base resin. The organic peroxide may be mixed, for example, simultaneously with the inorganic filler and the like, or may be mixed in any of stages of mixing the inorganic filler and the silane coupling agent, or may be mixed with a mixture of the inorganic filler and the silane coupling agent. For example, the organic peroxide may be mixed with the inorganic filler after the organic peroxide is mixed with the silane coupling agent, or may be mixed with the inorganic filler separately from the silane coupling agent. Only the silane coupling agent may be mixed with the inorganic filler, and then the organic peroxide may be mixed, depending on production conditions.

In addition, the organic peroxide may be a material mixed with any other component or a single body.

In the method of mixing the inorganic filler and the silane coupling agent, bonding force between the silane coupling agent and the inorganic filler is strong in wet mixing, and therefore volatilization of the silane coupling agent can be effectively suppressed, but the silanol condensation reaction becomes hard to progress in several cases. On the other hand, the silane coupling agent is easily volatilized in dry mixing, but the bonding force between the inorganic filler and the silane coupling agent is comparatively weak, and therefore the silanol condensation reaction becomes easy to progress efficiently.

In the production method of the present invention, the obtained mixture, all or part of the base resin, and the remaining component(s) that is not mixed in the step (a-1) are subsequently melt-kneaded in the presence of the organic peroxide while the mixture is heated to the temperature equal to or higher than the decomposition temperature of the organic peroxide (step (a-2)).

In the step (a-2), the temperature at which the above-described component are melt-mixed is equal to or higher than the decomposition temperature of the organic peroxide, preferably a temperature of the decomposition temperature of the organic peroxide plus (25 to 110)° C. This decomposition temperature is preferably set after the resin components are melted. If the above-described mixing temperature is applied, the above-described components are melted, and the organic peroxide is decomposed and acts thereon, and a required silane grafting reaction sufficiently progresses in the step (a-2). Other conditions, for example, a mixing time can be appropriately set.

A mixing method is not particularly limited, as long as the mixing method is a method ordinarily applied for rubber, plastic or the like. A mixing device may be appropriately selected depending on, for example, the mixing amount of the inorganic filler. As a mixing device, a single-screw extruder, a twin-screw extruder, a roll, a Banbury mixer, or various kneaders may be used. From the standpoint of the dispersibility of the resin components and the stability of the crosslinking reaction, an enclosed mixer such as Banbury mixer or various kneaders is preferable.

In addition, when the inorganic filler is blended exceeding 100 parts by mass with respect to 100 parts by mass of the base resin, the melt-mixing is preferably performed with an enclosed mixer such as a continuous mixer, a pressured kneader, or a Banbury mixer.

The method of mixing the base resin is not particularly limited. For example, a base resin preliminarily mixed and prepared may be directly mixed, or each component, for example, each of the resin component such as chlorinated polyethylene, the oil component or the plasticizer may be separately mixed.

In the present invention, when each component described above is melt-mixed at one time, melt-mixing conditions are not particularly limited, and the conditions in the step (a-2) can be adopted.

In this case, part or all of the silane coupling agent is adsorbed or bonded to the inorganic filler during melt-mixing.

In the step (a), particularly in the step (a-2), in the first embodiment, chloroprene rubber is preferably used as the base resin.

In the step (a), particularly in the step (a-2), in the second embodiment, polyvinyl chloride is preferably used as the base resin.

In the step (a), especially in the step (a-2), the above-mentioned each component is preferably melt-mixed without substantially mixing the silanol condensation catalyst. Thus, condensation reaction of the silane coupling agents can be suppressed, melt-mixing is easily conducted, and a desired shape can be obtained at the time of extrusion forming. Here, the term "without substantially mixing" does not meant to exclude the situation wherein the silanol condensation catalyst unavoidably exists, and means that the silanol condensation catalyst may exist at a degree at which the above-mentioned problem due to silanol condensation of the silane coupling agent is not caused. For example, in the step (a-2), the silanol condensation catalyst may exist when the content is 0.01 part by mass or less, with respect to 100 parts by mass of the base resin.

In the step (a), the blending amount of any other resin that can be used in addition to the above-described component or the above-described additive is appropriately set within the range in which the object of the present invention is not adversely affected.

In the step (a), the above-described additive, particularly, the antioxidant or the metal inactivator may be mixed in any step or to any component, but may be mixed in the carrier resin in view of not inhibiting the grafting reaction of the silane coupling agent mixed in the inorganic filler to the resin.

In the step (a), particularly in the step (a-2), it is preferable that the crosslinking assistant is not substantially mixed. If the crosslinking assistant is not substantially mixed, the crosslinking reaction between the resin components is hard to occur by the organic peroxide during melt-mixing, and the product having excellent extrusion appearance can be obtained. In addition, the grafting reaction of the silane coupling agent to the resin is hard to occur, and the product having excellent heat resistance can be obtained. Here, an expression "not substantially mixed" means that the crosslinking assistant may exist at a degree at which the above-described problem is not caused, and does not exclude the crosslinking assistance existing inevitably.

Thus, the silane master batch (also referred to as a silane MB) for use in producing the master batch mixture is prepared by performing the step (a). This silane MB contains a silane crosslinkable resin in which the silane coupling agent is grafted to the base resin at a degree at which the resin can be formed in the step (b) described later.

In the production method of the present invention, the step (b) in which the silane MB obtained in the step (a) is mixed with the silanol condensation catalyst, and then the resultant mixture is formed, is subsequently performed.

In the step (b), when part of the resin is melt-mixed in the above-described step (a-2), it is preferred that the remainder of the resin and the silanol condensation catalyst be melt-mixed, to prepare a catalyst master batch (also referred to as a catalyst MB), and this catalyst MB be used. In addition, any other resin can be used in addition to the remainder of the base resin.

In the mixing in the step (b) in the first embodiment, as mentioned above, chloroprene rubber is preferably used as the remainder of the base resin.

In the mixing in the step (b) in the second embodiment, as mentioned above, polyvinyl chloride can be used as the remainder of the base resin.

A mixing ratio of the above described remainder of the base resin as the carrier resin to the silanol condensation reaction catalyst is not particularly limited, but is preferably set so as to satisfy the above-described content in the step (a).

The mixing only needs to be performed by a method having a capability of uniformly performing mixing, and specific examples thereof include mixing (melt-mixing) performed under melting of the base resin. The melt-mixing can be performed in a manner similar to the melt-mixing in the above-described step (a-2). For example, the mixing temperature is preferably from 80 to 250° C., and more preferably from 100 to 240° C. Other conditions such as a mixing time can be appropriately set.

The catalyst MB to be thus prepared is a mixture of the silanol condensation catalyst and the carrier resin, and the filler to be added if desired.

On the other hand, when all of the base resin is melt-mixed in the step (a-2), the silanol condensation catalyst itself, or a mixture of any other resin and the silanol condensation catalyst is used in the step (b). A method of mixing any other resin and the silanol condensation catalyst is similar to the method for the above-described catalyst MB.

A blending amount of any other resin is preferably 1 to 60 parts by mass, more preferably 2 to 50 parts by mass, and further preferably 2 to 40 parts by mass, with respect to 100 parts by mass of the base resin, in view of capability of promoting the grafting reaction in the step (a-2), and also difficulty in generating the aggregated substance during forming.

In the production method of the present invention, the silane MB and the silanol condensation catalyst (the silanol condensation catalyst itself, the catalyst MB prepared or the mixture of the silanol condensation catalyst and any other resin) are mixed.

As the mixing method, any mixing method may be employed as long as the uniform mixture can be obtained as mentioned above. For example, the mixing is basically similar to the melt-mixing in the step (a-2). There are resin components whose melting points cannot be measured by DSC or the like, elastomers for example, but melt-mixing is performed at a temperature at which at least the base resin melts. The melting temperature is appropriately selected according to the melting temperature of the base resin or the carrier resin, and it is preferably from 80 to 250° C., and more preferably from 100 to 240° C. Other conditions, for example, a mixing (kneading) time can be appropriately set.

In the step (b), in order to avoid the silanol condensation reaction, it is preferable that the silane MB and the silanol condensation catalyst are not kept in a high temperature state for a long period of time in the state of being mixed.

In the step (b), the silane MB and the silanol condensation catalyst only need to be mixed, and the silane MB and the catalyst MB are preferably melt-mixed.

In the present invention, the silane MB and the silanol condensation catalyst can be dry-blended before both are melt-mixed. A method and conditions of dry blending are not particularly limited, and specific examples thereof include dry mixing and conditions in the step (a-1). The master batch mixture containing the silane MB and the silanol condensation catalyst is obtained by this dry blending.

In the step (b), the inorganic filler may be used. In this case, a blending amount of the inorganic filler is not particularly limited, and is preferably 350 parts by mass or less, with respect to 100 parts by mass of the carrier resin. The reason is that, if the blending amount of the inorganic filler is excessively large, the silanol condensation catalyst is hard to disperse, and the crosslinking becomes hard to progress. On the other hand, if the blending amount of the inorganic filler is excessively small, a crosslinking degree of the formed body is reduced and sufficient heat resistance is not obtained in several cases.

In the present invention, the mixing in the step (a) and step (b) can be simultaneously or continuously performed.

In the step (b), the mixture thus obtained is formed (shaped). This forming step only needs to be capable of forming the mixture, and a forming method and forming conditions are appropriately selected according to a form of the heat-resistant product of the present invention. Specific examples of the forming method include extrusion forming using an extruder, extrusion forming using an injection forming machine, and forming using any other forming machine. The extrusion forming is preferable when the heat-resistant product of the present invention is the electric wire or the optical fiber cable.

In the step (b), the forming step can be performed simultaneously with the above-described mixing step or both steps can be continuously performed. That is, specific examples of one embodiment of the melt-mixing in the mixing step include an aspect of melt-mixing a forming raw material, in the melt-forming, for example, in the extrusion forming, or immediately before the extrusion forming. For example, pellets may be blended with each other at ordinary temperature or a high temperature, such as dry blend, and then placed (melt-mixed) in a forming machine, or the pellets may be blended, and then melt-mixed, re-pelletized, and then placed in a forming machine. More specifically, a series of steps can be employed in which a mixture of the silane MB and the silanol condensation catalyst (forming-raw materials) is melt-mixed in a coating device, and subsequently, extruded and coated on a periphery of a conductor or the like, and formed into a desired shape.

Thus, the formed body of the heat-resistant crosslinkable chlorine-containing resin composition is obtained, in which the silane master batch and the silanol condensation catalyst are dry-blended, to prepare the master batch mixture, and the master batch mixture is introduced into the forming machine and formed.

Here, a melt mixture of the master batch mixture contains the silane crosslinkable resins with different crosslinking methods. In this silane crosslinkable resin, the reaction site of the silane coupling agent may be bonded or adsorbed to the inorganic filler, but is not subjected to silanol condensation as described later. Accordingly, the silane crosslinkable resin at least contains a crosslinkable resin in which the silane coupling agent bonded or adsorbed to the inorganic filler is grafted to the base resin, particularly to chlorinated polyethylene and chloroprene rubber or polyvinyl chloride, and a crosslinkable resin in which the silane coupling agent not bonded or adsorbed to the inorganic filler is grafted to the base resin. In addition, the silane crosslinkable resin may have the silane coupling agent to which the inorganic filler is bonded or adsorbed, and the silane coupling agent to which the inorganic filler is not bonded or adsorbed. Further, the silane crosslinkable resin may contain the resin component unreacted with the silane coupling agent.

As described above, the silane crosslinkable resin is an uncrosslinked body in which the silane coupling agent is not subjected to silanol condensation. Practically, if the melt-mixing is performed in the step (b), crosslinking of part (partial crosslinking) is inevitable, but at least formability during forming is to be kept on the heat-resistant chlorine-containing crosslinkable composition to be obtained.

In the formed body to be obtained through the step (b), partial crosslinking is inevitable in a manner similar to the above-described mixture, but the formed body is in a partially crosslinked state of keeping formability at which the composition can be formed in the step (b). Accordingly, this heat-resistant chlorine-containing crosslinked resin formed body of the present invention is obtained as a formed body crosslinked or finally crosslinked, by performing the step (c).

In addition, the formed body obtained according to the step (b) in the second embodiment has small adhesiveness, and has characteristics hard to cause adhesion (adhesion resistance) even in a state in which the formed bodies are brought into contact with each other.

In the method for producing the heat-resistant chlorine-containing crosslinked resin formed body of the present invention, the step (c) of bringing the formed body obtained in the step (b) into contact with water is performed. Thus, the reaction site of the silane coupling agent is hydrolyzed into silanol, and hydroxyl groups of the silanol are subjected to condensation by the silanol condensation catalyst existing in the formed body, and the crosslinking reaction occurs. Thus, the heat-resistant chlorine-containing crosslinked resin formed body in which the silane coupling agent is subjected to silanol condensation and crosslinked can be obtained.

The treatment itself in this step (c) can be carried out according to an ordinary method. The condensation reaction between the silane coupling agents progresses just in storage at ordinary temperature. In particular, as mentioned above, this silane crosslinking (condensation) rapidly progresses in the heat-resistant crosslinkable chlorine-containing resin composition containing chloroprene rubber or polyvinyl chloride as the base resin. Accordingly, in the step (c), it is unnecessary to positively bring the formed body into contact with water.

In order to accelerate this crosslinking reaction, the formed body can also be contacted positively with moisture. For example, the method of positively contacting the formed body with water can be employed, such as immersion into warm water, placement in a wet heat bath, and exposure to high temperature water vapor. In addition, pressure may be applied in order to penetrate moisture thereinto on the above occasion.

Thus, the method for producing the heat-resistant chlorine-containing crosslinked resin formed body of the present invention is performed, and the heat-resistant chlorine-containing crosslinked resin formed body is produced. This heat-resistant chlorine-containing crosslinked resin formed body contains a crosslinked resin in which the (silane crosslinkable) resins are subjected to condensation through silanol bonding (siloxane bonding). As one form of this silane crosslinked resin formed body, the formed body contains the silane crosslinked resin and the inorganic filler. Here, the inorganic filler may be bonded to the silane coupling agent of the silane crosslinked resin. Accordingly, the present invention includes an aspect in which the base resin is crosslinked with the inorganic filler through the silanol bonding. Specifically, the silane crosslinked resin contains at least the crosslinked resin in which a plurality of crosslinked resins are bonded or adsorbed to the inorganic filler by the silane coupling agent and are bonded (crosslinked) through the inorganic filler and the silane coupling agent, and the crosslinked resin in which the reaction sites of the silane coupling agent grafted to the above-described crosslinkable resin are hydrolyzed and cause the silanol condensation reaction with each other, thereby being crosslinked through the silane coupling agent. In addition, in the silane crosslinked resin, bonding (crosslinking) through the inorganic filler and the silane coupling agent and crosslinking through the silane coupling agent may be mixed. Further, the silane crosslinked resin may contain the resin component unreacted with the silane coupling agent and/or the uncrosslinked silane crosslinkable resin.

The above-described production method of the present invention can be described as follows.

The method for producing the heat-resistant chlorine-containing crosslinked resin formed body, having the following step (A), step (B) and step (C), in which the step (A) has the following step (A1) to step (A4).

Step (A): a step of mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin containing a chlorinated polyethylene and either a chloroprene rubber or a polyvinyl chloride; and a silanol condensation catalyst, to obtain a mixture.

Step (B): a step of forming the mixture obtained in the step (A), to obtain a formed body.

Step (C): a step of bringing the formed body obtained in the step (B) into contact with water, to obtain a heat-resistant chlorine-containing crosslinked resin formed body.

Step (A1): a step of mixing at least the inorganic filler and the silane coupling agent.

Step (A2): a step of melt-mixing the mixture obtained in the step (A1) and all or part of the base resin, in the presence of the organic peroxide, at a temperature equal to or higher than a decomposition temperature of the organic peroxide.

Step (A3): a step of mixing the silanol condensation catalyst with, as a carrier resin, a resin different from the base resin or a remainder of the base resin.

Step (A4): a step of mixing the melt-mixture obtained in the step (A2) with the mixture obtained in the step (A3).

In the above-described method, an amount of the organic peroxide in the first embodiment is 0.003 to 0.2 part by mass.

In the above-described method, chloroprene rubber in the first embodiment is preferably mixed in any step of the steps (A2), (A3) and (A4) described above, preferably mixed in the step (A2) or (A4), and preferably mixed at least in the step (A4) described above.

In the above-described method, polyvinyl chloride in the second embodiment is preferably mixed in any step of the steps (A2), (A3) and (A4) described above, preferably mixed in the step (A2) or (A4), and preferably mixed at least in the step (A2) described above.

In the above-described method, the step (A) corresponds to the mixing in the above-described step (a) and a step to the mixing in the step (b), the step (B) corresponds to the forming step in the above-described step (b), and the step (C) corresponds to the above-described step (c). In addition, the step (A1), the step (A2), the step (A3) and step (A4) correspond to the above-described step (a-1), step (a-2), and the step to the mixing in the above-described step (b), respectively.

Details of a reaction mechanism in the production method of the present invention are unknown yet, but it is considered as described below.

First, improvement in poor extrusion appearance, prevention of reduction of physical properties and development of heat resistance in the heat-resistant chlorine-containing crosslinked resin formed body will be described.

In general, if the organic peroxide is added to the base resin, particularly, chlorinated polyethylene, chloroprene rubber and polyvinyl chloride, a radical is rapidly generated to facilitate occurrence of the crosslinking reaction between the base resins or the decomposition reaction thereof. Thus, the aggregated substance is generated in the obtained heat-resistant chlorine-containing crosslinked resin formed body and the physical properties are reduced.

However, in the present invention, a large amount of the silane coupling agent is blended, and the silane coupling agent is further preliminarily bonded to the inorganic filler by the silanol bonding, the hydrogen bonding or the intermolecular bonding, in the step (a). In particular, in the preferred embodiment of the step (a), the treatment in which this bonding is formed, and the melt-mixing treatment are conducted, separately. Thus, it is considered that a chance of causing the grafting reaction between the grafting reaction site of the silane coupling agent and the base resin, in particular, chlorinated polyethylene, chloroprene rubber, and polyvinyl chloride to be preferably used, is increased. It is considered that a reaction of boding this kept silane coupling agent to the radical generated in the base resin becomes dominant over the crosslinking reaction between the base resins or the decomposition reaction as described above.

Further, in a preferred aspect of the second embodiment of the present invention, melt-mixing in the step (a) is performed in the coexistence of polyvinyl chloride. That is, the base resin containing chlorinated polyethylene and polyvinyl chloride is used in the step (a).

Chlorinated polyethylene comparatively easily performs the crosslinking reaction by the organic peroxide, but in polyvinyl chloride, the decomposition reaction becomes dominant rather than the crosslinking reaction. Accordingly, it is considered that, if the organic peroxide is decomposed in the presence of such a large amount of the silane coupling agent in the above-described preferred aspect, the grafting reaction of the silane coupling agent and the decomposition reaction of polyvinyl chloride as mentioned above become dominant by the coexistence of chlorinated polyethylene and polyvinyl chloride, and the crosslinking reaction of polyvinyl chloride becomes significantly small. Accordingly, generation of a crosslinked portion and a gel portion by the side reaction can be suppressed.

Thus, in the present invention, the silane crosslinking reaction to the base resin can be performed, and during this reaction (step (a)), deterioration or the crosslinking reaction of the base resin, particularly, chlorinated polyethylene (chlorinated polyethylene and chloroprene rubber in the first embodiment) is not caused, and therefore generation of the aggregated substance or reduction of the physical properties is hard to be caused, and the heat-resistant chlorine-containing crosslinked resin formed body having excellent extrusion appearance can be obtained.

When these materials are melt-mixed in the step (a), the silane coupling agent bonded or adsorbed to the inorganic filler by weak bonding (interaction by the hydrogen bonding, interaction between ions, partial charges or dipoles, action by adsorption or the like) is detached from the inorganic filler, resulting in causing the grafting reaction with the base resin. In the silane coupling agent thus graft-reacted, the reaction sites capable of silanol condensation are subjected to the condensation reaction (crosslinking reaction) to form the base resin crosslinked through the silanol condensation. The heat resistance of the heat-resistant chlorine-containing crosslinked resin formed body obtained through this crosslinking reaction is increased, and, for example, the heat-resistant chlorine-containing crosslinked resin formed body which is not melted even at a high temperature can be obtained.

On the other hand, in the silane coupling agent bonded to the inorganic filler by strong bonding (chemical bonding with the hydroxyl group or the like on the surface of the inorganic filler, or the like), this condensation reaction by the silanol condensation catalyst in the presence of water is hard to occur, and bonding with the inorganic filler is kept. Therefore, bonding (crosslinking) of the base resin with the inorganic filler through the silane coupling agent is formed. Thus, adhesion between the base resin and the inorganic filler is consolidated, and the formed body that is excellent in mechanical strength (strength) and abrasion resistance and hard to be scratched is obtained. In particular, a plurality of silane coupling agents can be bonded to one inorganic filler particle surface, and high mechanical strength (strength) can be obtained.

It is estimated that the heat-resistant chlorine-containing crosslinked resin formed body having high heat resistance can be obtained by forming these silane-grafted resins together with the silanol condensation catalyst, and then bringing the resultant material into contact with moisture.

In the present invention, the heat-resistant chlorine-containing crosslinked resin formed body having high heat resistance can be obtained by mixing the organic peroxide in a ratio of 0.003 part by mass or more, preferably 0.005 part by mass or more, and 0.3 part by mass or less, and preferably 0.2 part by mass or less, more preferably 0.1 part by mass or less, and further mixing the silane coupling agent in a ratio of more than 2 parts by mass and 15 parts by mass or less, with respect to 100 parts by mass of the base resin, in the presence of the inorganic filler.

In the present invention, the base resin contains a chlorinated polyethylene and either a chloroprene rubber or a polyvinyl chloride. Therefore, a heat-resistant chlorine-containing crosslinked resin formed body exhibits excellent weather resistance and oil resistance. In addition, in the present invention, the heat-resistant chlorine-containing crosslinked resin formed body having excellent characteristics mentioned above can be produced with satisfactory productivity.

In the first embodiment, the reason why the above-described effect is obtained can be considered as described below.

That is, in the first embodiment, at least one of mixing of the melt-mixing in the step (a) and the mixing in the step (b) is performed in the coexistence of a chloroprene rubber. In particular, high heat resistance, weather resistance and oil resistance can be obtained as the formed body, namely by using chloroprene rubber as the carrier resin for the silanol condensation catalyst in the step (b), even if the silane grafting reaction to the base resin does not sufficiently progress in the step (a), and the formed body having excellent extrusion appearance, heat resistance, weather resistance and oil resistance can be obtained. The reason is not fully known yet, but it is considered that chlorinated polyethylene and chloroprene rubber subjected to the silane grafting reaction are partially bonded by the melt-mixing, and heat resistance and reinforcement can be obtained. Thus, even if the silane grafting reaction to the base resin in the step (a) does not sufficiently progress, the formed body having high heat resistance can be obtained. Therefore, it is considered that the side reaction such as a reaction between the silane coupling agents in the step (a) can be suppressed, and therefore heat resistance, weather resistance and oil resistance can be obtained while obtaining the formed body excellent in extrusion appearance.

Next, improvement in external damage or break (appearance roughness) of a coated-electric-wire coating as caused by adhesiveness of the resin, in the heat-resistant chlorine-containing crosslinked resin formed body will be described.

In the second embodiment, polyvinyl chloride is used as the base resin preferably in the step (a). Thus, as mentioned above, the grafting reaction of the silane coupling agent by the organic peroxide can be delayed and uniformized by a difference in reactivity between chlorinated polyethylene and polyvinyl chloride. Furthermore, the crosslinking reaction of chlorinated polyethylene with each other as the side reaction can be significantly suppressed.

In addition, polyvinyl chloride has low tackiness and low bonding properties, and a low molecular-weight product is partially formed by the organic peroxide. This low molecular-weight product is easily exposed to a surface during extrusion forming, and therefore it is considered that the tackiness on the surface of the formed body is significantly reduced. In addition, polyvinyl chloride has a high Young's modulus, and is also excellent in toughness.

Accordingly, in a stage in which the crosslinking reaction of the base resin does not sufficiently progress, even in a state in which the base resins (the heat-resistant crosslinkable chlorine-containing resin composition of the present invention and the formed body thereof) are brought into contact with each other, the base resins are hard to adhere to each other, and a state (for example, a shape) before being brought into contact therewith can be maintained. Thus, appearance roughness (external damage or break) of the base resin can be prevented.

For example, when the electric wire is produced, even if an electric wire precursor having the formed body of the heat-resistant crosslinkable chlorine-containing resin composition is wound around a circumference of the conductor, the electric wire precursors are hard to adhere to each other. Therefore, even if the electric wire precursor is brought into contact with moisture in this state, and furthermore is rewound, the electric wire free from appearance roughness can be produced.

In the second embodiment, as mentioned above, poor extrusion appearance caused by generation of the aggregated substance and appearance roughness caused by adhesiveness of the base resin can be solved.

The production method of the present invention can be applied to producing a product (including a semi-finished product, a part or a member) requiring heat resistance, and further a product requiring any of weather resistance, oil resistance, strength and flame retardancy, a constituent part of a product such as a rubber material, or the member thereof. Accordingly, the heat-resistant product of the present invention is taken as the product having heat resistance and further excellent weather resistance and/or oil resistance and the like as described above. At this time, the heat-resistant product may be a product containing the heat-resistant chlorine-containing crosslinked resin formed body, or may be a product consisting essentially of the heat-resistant chlorine-containing crosslinked resin formed body.

Specific examples of such a heat-resistant product include an electric wire such as a heat-resistant flame-retardant insulated wire, a coating material for heat-resistant flame-retardant cable or optical fiber cable, a rubber substitute wire and cable material, other heat-resistant flame-retardant wire parts, a flame-retardant heat-resistant sheet, and a flame-retardant heat-resistant film. In addition, the specific examples further include a power supply plug, a connector, a sleeve, a box, a tape-base material, a tube, a sheet, a packing, a cushion material, a seismic isolating material, a wiring material used in internal and external wiring for electric and electronic instruments, and particularly an electric wire or an optical fiber cable.

Among the above described products, the production method of the present invention is particularly preferably applied to production of electric wire and optical fiber cable, and it can form a coating material (an insulator, a sheath) thereof.

When the heat-resistant product of the present invention is an extrusion formed article such as the electric wire or the optical fiber cable, the product can be produced, preferably, while forming raw materials are melt-kneaded in the extruder (extrusion coating device) to prepare the heat-resistant crosslinkable chlorine-containing resin composition, by extruding this heat-resistant crosslinkable chlorine-containing resin composition on an outer periphery of the conductor or the like, to coat the conductor or the like. In particular, according to the second embodiment, even if the final crosslinking step (c) is performed in a state in which the electric wire precursor thus produced is wound around a bobbin or the like, the electric wire excellent in appearance can be produced. Thus, the electric wire can be stored in a state in which the long electric wire precursor is brought into contact therewith, and the crosslinking step can be performed, and therefore productivity is improved.

Such a heat-resistant product of the present invention can be formed by extruding and coating the heat-resistant crosslinkable chlorine-containing resin composition, even if a large amount of inorganic fillers is added thereto, on a circumference of a conductor or a circumference of a conductor longitudinally lapped or twisted with tensile strength fibers, by using a general-purpose extrusion coating device, without using a special machine such as an electron beam crosslinking machine. For example, as the conductor, a single wire, a stranded wire or the like of annealed copper can be used. Moreover, as the conductor, in addition to a bare wire, a tin-plated conductor or a conductor having an enamel-coating insulation layer can be used. A thickness of the insulation layer (coating layer formed of the heat resistant crosslinkable chlorine-containing resin composition of the present invention) formed around the conductor is not particularly limited, but is generally about 0.15 to 5 mm.

EXAMPLES

The present invention will be described in more detail based on examples given below, but the invention is not meant to be limited by these.

In Tables 1 to 4, the numerical values for the content of the respective Examples and Comparative Examples are in terms of part by mass, unless otherwise specified.

Test 1

Details of each compound shown in Tables 1 and 2 are described below.

A chlorine content of chlorinated polyethylene is determined based on the above-described measuring method.

<Resin>
(Chlorinated Polyethylene)
"ELASLEN 401A" (trade name, manufactured by Showa Denko K.K., chlorinated polyethylene, chlorine content: 40% by mass)
"ELASLEN 402NA-X5" (trade name, manufactured by Showa Denko K.K., chlorinated polyethylene, chlorine content: 40% by mass)
"ELASLEN 351A" (trade name, manufactured by Showa Denko K.K., chlorinated polyethylene, chlorine content: 35% by mass)
"ELASLEN 353" (trade name, manufactured by Showa Denko K.K., chlorinated polyethylene, chlorine content: 35% by mass)
(Chloroprene Rubber)
"SKYPRENE E-33" (trade name, manufactured by Tosoh Corporation, chloroprene rubber, chlorine content: 40% by mass)
"SKYPRENE Y-31" (trade name, manufactured by Tosoh Corporation, chloroprene rubber, chlorine content: 40% by mass)
"SKYPRENE TSR-48 (trade name, manufactured by Tosoh Corporation, chloroprene rubber, chlorine content: 40% by mass)
(Any Other Components)
"EV180" (trade name, Evaflex EV180, manufactured by Du Pont-Mitsui Polychemicals Co., Ltd., ethylene-vinyl acetate copolymer resin)
"RESAMINE P-2288" (trade name, manufactured by Dainichiseika Color & Chemicals Mfg. Co., Ltd., thermoplastic polyurethane-based elastomer)
"Hytrel 2401" (trade name, manufactured by DU PONT-TORAY CO., LTD., polyester elastomer)
"BY27-220" (trade name, manufactured by Dow Corning Toray Co., Ltd., resin of an ethylene-vinylacetate copolymer modified with polyorganosiloxane)
<Organic Peroxide>
"PERHEXA 25B" (trade name, manufactured by NOF CORPORATION., 2,5-dimethyl-2,5-di(tert-butylperoxy) hexane, decomposition temperature 149° C.)
<Inorganic Filler>
"DHT4-A" (trade name, manufactured by Kyowa Chemical Industry Co., Ltd., hydrotalcite)
"KISUMA 5L" (trade name, manufactured by Kyowa Chemical Industry Co., Ltd., magnesium hydroxide pretreated with a silane coupling agent) "CRYSTALITE 5X" (trade name, manufactured by Tatsumori Ltd., crystalline silica)
"SOFTON 2200" (trade name, manufactured by BIHOKU FUNKA KOGYO CO., LTD., calcium carbonate)
"Aerosil 200" (trade name, manufactured by Japan Aerosil corporation, hydrophilic fumed silica, amorphous silica)
<Silane Coupling Agent>
"KBM-1003" (trade name, manufactured by Shin-Etsu Chemical Co., Ltd., vinyltrimethoxysilane)
"KBE-1003" (trade name, manufactured by Shin-Etsu Chemical Co., Ltd., vinyltriethoxysilane)
<Silanol Condensation Catalyst>
"ADKSTAB OT-1" (trade name, manufactured by ADEKA CORPORATION, dioctyltin dilaurate)
<Antioxidizing Agent>
"IRGANOX 1010" (trade name, manufactured by BASF, pentaerythritol tetrakis [3-(3,5-di-tert-butyl-4-hydroxyphenyl)propionate])

Examples 1A to 12A and Comparative Examples 1A to 8A

In Examples 1A to 12A and Comparative Examples 1A to 8A, part of a base resin was used as a carrier resin for a catalyst MB.

First, an inorganic filler and a silane coupling agent, in mass ratios listed in Tables 1 and 2, were placed in a 10 L Henschel mixer manufactured by Toyo Seiki Seisaku-sho, Ltd. and the resultant mixture was mixed at room temperature (25° C.) for 1 hour to obtain a powder mixture. Next, the power mixture thus obtained, and each component listed in the base resin column and the organic peroxide in Tables 1 and 2, in mass ratios listed in Tables 1 and 2, were placed in a 2 L Banbury mixer manufactured by Nippon Roll MFG. Co., Ltd., and the resultant mixture was melt-mixed at a temperature equal to or higher than a decomposition temperature of the organic peroxide, specifically, at 190° C., for 10 minutes, and then discharged at a material discharge temperature of 190° C., to obtain a silane MB. The silane MB obtained contains a silane crosslinkable resin in which the silane coupling agent is graft-reacted onto the base resin.

Meanwhile, a carrier resin, a silanol condensation catalyst and an antioxidant were melt-mixed by a Banbury mixer at 180 to 190° C., in mass ratios listed in Tables 1 and 2, and the resultant mixture was discharged at material discharge temperature of 180 to 190° C., to obtain a catalyst MB. This catalyst MB is a mixture of the carrier resin and the silanol condensation catalyst.

Subsequently, the silane MB and the catalyst MB were placed in an enclosed ribbon blender, and the resultant mixture was dry-blended at room temperature (25° C.) for 5 minutes, to obtain a dry-blended product (master batch mixture). At this time, a mixing ratio of the silane MB to the catalyst MB is a mass ratio listed in Tables 1 and 2.

Subsequently, the obtained dry-blended product was introduced into an extruder equipped with a screw having a screw diameter of 30 mm with L/D=24 (ratio of screw effective length L to diameter D) (compression zone screw temperature: 170° C., head temperature: 200° C.). While the dry-blended product was melt-mixed in this extruder, the melted mixture was coated on an outside of a 1/0.8 TA conductor at a thickness of 1 mm, to obtain a coated conductor having an outer diameter of 2.8 mm.

A heat-resistant crosslinkable chlorine-containing resin composition is prepared by melt-mixing the above-described dry-blended product in the extruder before extrusion forming. This heat-resistant crosslinkable chlorine-containing resin composition is a melt-mixture of the silane MB and the catalyst MB, and contains the above-mentioned silane crosslinkable resin.

The coated conductor thus obtained was brought into contact with moisture under conditions of <Crosslinking conditions 1> or <Crosslinking conditions 2>. Thus, an electric wire having a coating layer formed of the heat-resistant chlorine-containing crosslinked resin formed body on an outer periphery of the conductor was produced. The heat-resistant chlorine-containing crosslinked resin formed body as the coating layer has the above-mentioned silane crosslinked resin.

<Crosslinking conditions 1> The above-described coated conductor was left to stand under an atmosphere of a temperature of 40° C. and relative humidity of 95% for 4 hours.

<Crosslinking conditions 2> The above-described coated conductor was left to stand under an atmosphere of a temperature of 40° C. and relative humidity of 95% for one week.

The following test was conducted on each electric wire produced, and the results are shown in Table 1 and Table 2.

<Heat Deformation Test>

A heat deformation test was conducted on each electric wire produced under conditions of <Crosslinking conditions 1> and <Crosslinking conditions 2>, at a measuring temperature of 150° C. and a load of 5 N, based on UL1581.

In this test, with regard to heat deformation, a case where a deformation ratio was 50% or less was deemed as pass.

<Extrusion Appearance Test>

As an extrusion appearance test, appearance of the coated conductor obtained was observed and evaluated in producing the coated conductor by extrusion forming.

A product that was able to be formed into an electric wire form without the aggregated substance on the appearance of the coated conductor was expressed as "A", a product a surface of which was a little roughened even without the aggregated substance on the appearance of the coated conductor was expressed as "B", a product that was able to be formed into an electric wire form, although generation of the aggregated substance was able to be confirmed even at a degree of having no problem on the appearance, was expressed as "C", and a product that was unable to be formed into an electric wire form by significant generation of poor appearance was expressed as "D". In the extrusion appearance test, "C" evaluation or better is a pass level of this test.

<Oil Resistance>

An electric wire coating tubular piece sample having a length of 50 mm was prepared by extracting the conductor from each of the electric wires produced in Examples 1A, 6A and 7A and Comparative Example 8A, and mass thereof was measured.

Then, each electric wire coating tubular piece sample was immersed into JIS No. 2 oil at 90° C. for 18 hours, and then the JIS No. 2 oil was wiped off, and mass thereof was measured. A mass change between mass before immersion and mass after immersion was determined on each electric wire coating tubular piece sample.

In this oil resistance test, a product in which a mass increase before and after immersion was less than 15% by mass was deemed as a pass, as the product excellent in oil resistance.

TABLE 1

|  |  |  |  | This invention ||||||
|  |  |  |  | 1A | 2A | 3A | 4A | 5A | 6A |
| --- | --- | --- | --- | --- | --- | --- | --- | --- | --- |
| Silane MB | Base resin | Chlorinated polyethylene | ELASLEN 401A | 80 | 80 | 60 | 80 | 60 |  |
|  |  | Chlorinated polyethylene | ELASLEN 402NA-X5 |  |  |  |  |  |  |
|  |  | Chlorinated polyethylene | ELASLEN 351A |  |  |  |  |  | 60 |
|  |  | Chlorinated polyethylene | ELASLEN 353 |  |  |  |  |  |  |
|  |  | Chloroprene rubber | SKYPRENE E-33 |  | 10 | 10 |  |  |  |
|  |  | Chloroprene rubber | SKYPRENE Y-31 |  |  |  |  | 30 |  |
|  |  | Chloroprene rubber | SKYPRENE TSR-48 |  |  |  |  |  | 25 |
|  |  | Ethylene-vinyl acetate copolymer | EV180 |  |  |  |  |  |  |

TABLE 1-continued

| | | | | | | | | | |
|---|---|---|---|---|---|---|---|---|---|
| | | Polyurethane | RESAMINE P-2288 | | | | | | |
| | | Polyester elastomer | Hytrel 2401 | | | | | | |
| | | Silicone-containing EVA | BY27-220 | | | | | | 5 |
| | Organic peroxide | | PERHEXA 25B | 0.05 | 0.05 | 0.05 | 0.05 | 0.05 | 0.06 |
| | Inorganic filler | Hydrotalcite | DHT-4A | 4 | 4 | 4 | 1.5 | 4 | 4 |
| | | Magnesium hydroxide | KISUMA 5L | 60 | 60 | 60 | 60 | | 70 |
| | | Silica | CRYSTALITE 5X | | | | | | |
| | | Calcium carbonate | SOFTON 2200 | | | | | | |
| | | Silica | Aerosil 200 | | | | 3 | 0.4 | 1 |
| | Silane coupling agent | Vinyltrimethoxysilane | KBM-1003 | 5 | 5 | 5 | 6 | 2.5 | 8 |
| | | Vinyltriethoxysilane | KBE-1003 | | | | 6 | | |
| Catalyst MB | Carrier resin | Chlorinated polyethylene | ELASLEN 402NA-X5 | 5 | 10 | 5 | 8 | 7 | 8 |
| | | Chloroprene | SKYPRENE E-33 | 15 | | 25 | 12 | 3 | 2 |
| | | Ethylene-vinyl acetate copolymer | EV180 | | | | | | |
| | | | Hytrel 2401 | | | | | | |
| | Silanol condensation catalyst | Dioctyltin dilaurate | ADKSTAB OT-1 | 0.05 | 0.05 | 0.05 | 0.05 | 0.05 | 0.05 |
| | Antioxidizing agent | | IRGANOX 1010 | 0.1 | 0.1 | 0.1 | 0.1 | 0.1 | 0.1 |
| | Evaluation | Heat deformation test on wires obtained under <Crosslinking conditions 1> (%) | | 45 | 40 | 43 | 47 | 48 | 39 |
| | | Heat deformation test on wires obtained under <Crosslinking conditions 2> (%) | | 23 | 28 | 25 | 28 | 18 | 26 |
| | | Extrusion appearance test | | A | B | B | A | C | B |
| | | Oil resistance | | 4.5 | — | — | — | — | 9.9 |

| | | | | This invention | | | | | |
|---|---|---|---|---|---|---|---|---|---|
| | | | | 7A | 8A | 9A | 10A | 11A | 12A |
| Silane MB | Base resin | Chlorinated polyethylene | ELASLEN 401A | | | | 40 | 40 | 30 |
| | | Chlorinated polyethylene | ELASLEN 402NA-X5 | | | | | 30 | 30 |
| | | Chlorinated polyethylene | ELASLEN 351A | 60 | 60 | | | | |
| | | Chlorinated polyethylene | ELASLEN 353 | | | 60 | | | |
| | | Chloroprene rubber | SKYPRENE E-33 | | 10 | 20 | 20 | 20 | |
| | | Chloroprene rubber | SKYPRENE Y-31 | | | | | | |
| | | Chloroprene rubber | SKYPRENE TSR-48 | | | | | | 25 |
| | | Ethylene-vinyl acetate copolymer | EV180 | 10 | | | | | |
| | | Polyurethane | RESAMINE P-2288 | | 10 | | 30 | | |
| | | Polyester elastomer | Hytrel 2401 | | | 10 | | | |
| | | Silicone-containing EVA | BY27-220 | | | | | | 5 |
| | Organic peroxide | | PERHEXA 25B | 0.004 | 0.05 | 0.05 | 0.15 | 0.05 | 0.1 |
| | Inorganic filler | Hydrotalcite | DHT-4A | 4 | 4 | 4 | 4 | 8 | 4 |
| | | Magnesium hydroxide | KISUMA 5L | 60 | 50 | | 60 | 50 | 250 |
| | | Silica | CRYSTALITE 5X | | | 30 | 70 | | |
| | | Calcium carbonate | SOFTON 2200 | | | 20 | 70 | | 100 |
| | | Silica | Aerosil 200 | 8 | | 1 | 1 | 10 | |
| | Silane coupling agent | Vinyltrimethoxysilane | KBM-1003 | 6 | 2.5 | 8 | 8 | 14 | 15 |
| | | Vinyltriethoxysilane | KBE-1003 | 2 | | | | | |
| Catalyst MB | Carrier resin | Chlorinated polyethylene | ELASLEN 402NA-X5 | 7 | 8 | 5 | 7 | 7 | 3 |
| | | Chloroprene | SKYPRENE E-33 | 20 | 12 | 2 | 3 | 3 | 2 |
| | | Ethylene-vinyl acetate copolymer | EV180 | | | | | | 5 |
| | | | Hytrel 2401 | | | 3 | | | |
| | Silanol condensation catalyst | Dioctyltin dilaurate | ADKSTAB OT-1 | 0.05 | 0.05 | 0.05 | 0.05 | 0.05 | 0.05 |
| | Antioxidizing agent | | IRGANOX 1010 | 0.1 | 0.1 | 0.1 | 0.1 | 0.1 | 0.1 |
| | Evaluation | Heat deformation test on wires obtained under <Crosslinking conditions 1> (%) | | 46 | 45 | 35 | 30 | 34 | 29 |
| | | Heat deformation test on wires obtained under <Crosslinking conditions 2> (%) | | 40 | 27 | 22 | 12 | 18 | 14 |
| | | Extrusion appearance test | | A | B | B | C | C | C |
| | | Oil resistance | | 12.3 | — | — | — | — | — |

TABLE 2

|  |  |  |  | Comparative example | | | |
|---|---|---|---|---|---|---|---|
|  |  |  |  | 1A | 2A | 3A | 4A |
| Silane MB | Base resin | Chlorinated polyethylene | ELASLEN 401A |  |  |  |  |
|  |  | Chlorinated polyethylene | ELASLEN 402NA-X5 | 90 | 70 | 70 | 70 |
|  |  | Chlorinated polyethylene | ELASLEN 351A |  |  |  |  |
|  |  | Chlorinated polyethylene | ELASLEN 353 |  |  |  |  |
|  |  | Chloroprene rubber | SKYPRENE E-33 |  | 20 |  |  |
|  |  | Chloroprene rubber | SKYPRENE Y-31 |  |  | 15 | 20 |
|  |  | Chloroprene rubber | SKYPRENE TSR-48 |  |  |  |  |
|  |  | Polyurethane | RESAMINE P-2288 |  |  |  |  |
|  |  | Polyester elastomer | Hytrel 2401 |  |  |  |  |
|  |  | Silicone-containing EVA | BY27-220 |  |  | 5 |  |
|  | Organic peroxide |  | PERHEXA 25B | 0.05 | 0.4 | 0.001 | 0.05 |
|  | Inorganic filler | Hydrotalcite | DHT-4A | 4 | 4 | 4 | 0.2 |
|  |  | Magnesium hydroxide | KISUMA 5L | 60 | 60 | 60 |  |
|  |  | Silica | CRYSTALITE 5X |  |  |  |  |
|  |  | Calcium carbonate | SOFTON 2200 |  |  |  |  |
|  |  | Silica | Aerosil 200 |  |  |  |  |
|  | Silane coupling agent | Vinyltrimethoxysilane | KBM-1003 | 5 | 5 | 5 | 5 |
|  |  | Vinyltriethoxysilane | KBE-1003 |  |  |  |  |
| Catalyst MB | Carrier resin | Chlorinated polyethylene | ELASLEN 402NA-X5 | 10 | 10 | 10 | 10 |
|  | Silanol condensation catalyst | Dioctyltin dilaurate | ADKSTAB OT-1 | 0.05 | 0.05 | 0.05 | 0.05 |
|  | Antioxidizing agent |  | IRGANOX 1010 | 0.1 | 0.1 | 0.1 | 0.1 |
|  | Evaluation | Heat deformation test for wires obtained under <Crosslinking conditions 1> (%) |  | 60 | Could not be formed | 92 | Could not be formed |
|  |  | Heat deformation test for wires obtained under <Crosslinking conditions 2> (%) |  | 30 |  | 82 |  |
|  |  | Extrusion appearance test |  | A | D | A | D |
|  |  | Oil resistance |  | — | — | — | — |

|  |  |  |  | Comparative example | | | |
|---|---|---|---|---|---|---|---|
|  |  |  |  | 5A | 6A | 7A | 8A |
| Silane MB | Base resin | Chlorinated polyethylene | ELASLEN 401A |  |  |  |  |
|  |  | Chlorinated polyethylene | ELASLEN 402NA-X5 | 70 | 70 | 70 |  |
|  |  | Chlorinated polyethylene | ELASLEN 351A |  |  |  |  |
|  |  | Chlorinated polyethylene | ELASLEN 353 |  |  |  | 90 |
|  |  | Chloroprene rubber | SKYPRENE E-33 |  |  |  |  |
|  |  | Chloroprene rubber | SKYPRENE Y-31 | 20 | 20 | 20 |  |
|  |  | Chloroprene rubber | SKYPRENE TSR-48 |  |  |  |  |
|  |  | Polyurethane | RESAMINE P-2288 |  |  |  |  |
|  |  | Polyester elastomer | Hytrel 2401 |  |  |  |  |
|  |  | Silicone-containing EVA | BY27-220 |  |  |  |  |
|  | Organic peroxide |  | PERHEXA 25B | 0.05 | 0.05 | 0.05 | 0.05 |
|  | Inorganic filler | Hydrotalcite | DHT-4A | 4 | 4 | 4 | 4 |
|  |  | Magnesium hydroxide | KISUMA 5L | 300 | 100 | 100 | 60 |
|  |  | Silica | CRYSTALITE 5X |  |  |  |  |
|  |  | Calcium carbonate | SOFTON 2200 | 150 |  |  |  |
|  |  | Silica | Aerosil 200 |  |  |  |  |
|  | Silane coupling agent | Vinyltrimethoxysilane | KBM-1003 | 7 | 16 | 1 | 5 |
|  |  | Vinyltriethoxysilane | KBE-1003 |  | 4 |  |  |
| Catalyst MB | Carrier resin | Chlorinated polyethylene | ELASLEN 402NA-X5 | 10 | 10 | 10 | 10 |
|  | Silanol condensation catalyst | Dioctyltin dilaurate | ADKSTAB OT-1 | 0.05 | 0.05 | 0.05 | 0.05 |
|  | Antioxidizing agent |  | IRGANOX 1010 | 0.1 | 0.1 | 0.1 | 0.1 |
|  | Evaluation | Heat deformation test for wires obtained under <Crosslinking conditions 1> (%) |  | 78 | 36 | 86 | 65 |
|  |  | Heat deformation test for wires obtained under <Crosslinking conditions 2> (%) |  | 63 | 24 | 54 | 33 |
|  |  | Extrusion appearance test |  | D | D (foamed) | C | A |
|  |  | Oil resistance |  | — | — | — | 20.3 |

As is apparent from the results shown in Tables 1 and 2, in Examples 1A to 12A, all of the electric wires prepared under <Crosslinking conditions 1> and <Crosslinking conditions 2> passed the heat deformation test and the extrusion appearance test. Thus, according to the present invention, the electric wire having, as the coating, the heat-resistant chlorine-containing crosslinked resin formed body that was excellent in appearance and heat resistance and was not melted even at a high temperature was able to be produced. In addition, as specifically shown in Examples 1A, 6A and 7A, the heat-resistant chlorine-containing crosslinked resin formed body containing chlorinated polyethylene and chloroprene rubber was excellent also in oil resistance. Accordingly, the heat-resistant chlorine-containing crosslinked resin formed body containing chlorinated polyethylene and chloroprene rubber according to the present invention is found to be excellent in weather resistance and oil resistance. Further, the electric wires in Examples 1A to 12A exhibited heat resistance satisfying the pass level of the heat deformation test, even if the crosslinking conditions were moderate and the crosslinking time was short as in <Crosslinking conditions 1> in the crosslinking step (c). Accordingly, according to the present invention, the heat-resistant chlorine-containing crosslinked resin formed body having excellent characteristics describe above can be produced with satisfactory productivity.

In contrast, in Comparative Examples 1A and 8A without containing chloroprene rubber, the electric wire produced under <Crosslinking conditions 1> failed to pass the heat deformation test, and an improved effect of productivity was not recognized. In addition, in Comparative Example 2A in which the content of the organic peroxide was excessively large, even the extrusion forming was unable to be performed. In Comparative Example 3A in which the content of the organic peroxide was excessively small, even the electric wire prepared under <Crosslinking conditions 2> failed to pass the heat deformation test. In Comparative Example 4A in which the content of the inorganic filler was excessively small, the extrusion forming was unable to be performed. In Comparative Example 5A in which the content of the inorganic filler was excessively large, even the electric wire prepared under <Crosslinking conditions 2> failed to pass the heat deformation test. In Comparative Example 6A in which the content of the silane coupling agent was excessively large, the electric wire failed to pass the appearance test, and in Comparative Example 7A in which the content of the silane coupling agent was excessively small, even the electric wire prepared under <Crosslinking conditions 2> failed to pass the heat deformation test.

Test 2

Details of each compound shown in Tables 3 and 4 are described below.

A chlorine content of chlorinated polyethylene is determined based on the above-described measuring method.

<Resin>
(Chlorinated Polyethylene)
"ELASLEN 401A" (trade name, manufactured by Showa Denko K.K., chlorinated polyethylene, chlorine content: 40% by mass)
"ELASLEN 402NA-X5" (trade name, manufactured by Showa Denko K.K., chlorinated polyethylene, chlorine content: 40% by mass)
"ELASLEN 351A" (trade name, manufactured by Showa Denko K.K., chlorinated polyethylene, chlorine content: 35% by mass)
"ELASLEN 301A" (trade name, manufactured by Showa Denko K.K., chlorinated polyethylene, chlorine content: 30% by mass)
(Polyvinyl Chloride)
"ZEST 1400" (trade name, manufactured by Shin Dai-Ichi Vinyl Corporation, polyvinyl chloride)
"ZEST 1000" (trade name, manufactured by Shin Dai-Ichi Vinyl Corporation, polyvinyl chloride)
"ZEST 2500" (trade name, manufactured by Shin Dai-Ichi Vinyl Corporation, polyvinyl chloride)
(Other Components)
"SKYPRENE E-33" (trade name, manufactured by Tosoh Corporation, chloroprene rubber, chlorine content: 40% by mass)
"ADK CIZER C-9N" (trade name, manufactured by ADEKA Corporation, trimellitic acid-based plasticizer)
"ADK CIZER PN-650" (trade name, manufactured by ADEKA Corporation, polyester-based plasticizer)
"Shell DL911P" (trade name, manufactured by Shell Chemicals Japan Ltd., phthalic acid-based plasticizer)
"EV180" (trade name: Evaflex EV180, manufactured by Du Pont-Mitsui Polychemicals Co., Ltd., ethylene-vinyl acetate copolymer resin) "Hytrel 2401" (trade name, manufactured by DU PONT-TORAY CO., LTD., polyester elastomer)
"BY27-220" (trade name, manufactured by Dow Corning Toray Co., Ltd., resin of an ethylene-vinylacetate copolymer modified with polyorganosiloxane)

<Organic Peroxide>
"PERHEXA 25B" (trade name, manufactured by NOF CORPORATION, 2,5-dimethyl-2,5-di(tert-butylperoxy)hexane, decomposition temperature 149° C.)
"PERCUMYL D" (trade name, manufacture by NOF CORPORATION, dicumyl peroxide, decomposition temperature 151° C.)

<Inorganic Filler>
"DHT4A" (trade name, manufactured by Kyowa Chemical Industry Co., Ltd., hydrotalcite)
"KISUMA 5L" (trade name, manufactured by Kyowa Chemical Industry Co., Ltd., magnesium hydroxide pretreated with a silane coupling agent)
"CRYSTALITE 5X" (trade name, manufactured by Tatsumori Ltd., crystalline silica)
"SOFTON 2200" (trade name, manufactured by BIHOKU FUNKA KOGYO CO., LTD., calcium carbonate)
"Aerosil 200" (trade name, manufactured by Japan Aerosil corporation, hydrophilic fumed silica, amorphous silica)

<Silane Coupling Agent>
"KBM-1003" (trade name, manufactured by Shin-Etsu Chemical Co., Ltd., vinyltrimethoxysilane)
"KBE-1003" (trade name, manufactured by Shin-Etsu Chemical Co., Ltd., vinyltriethoxysilane)

<Silanol Condensation Catalyst>
"ADKSTAB OT-1" (trade name, manufactured by ADEKA CORPORATION, dioctyltin dilaurate)

<Antioxidizing Agent>
"IRGANOX 1010" (trade name, manufactured by BASF, pentaerythritol tetrakis [3-(3,5-di-tert-butyl-4-hydroxyphenyl)propionate])

Examples 1B to 14B and Comparative Examples 1B to 5B

Coated conductors in Examples 1B to 14B and Comparative Examples 1B to 5B were prepared in the same manner as in Test Example 1 except that materials shown in Tables 3 and 4 were used.

The coated conductor thus obtained was wound around a bobbin having a barrel diameter of 250 mm by 100 m. In this state, the resultant was left to stand under an atmosphere of a temperature of 40° C. and relative humidity of 95% for one week, to bring the coated conductor (formed body of the heat-resistant crosslinkable chlorine-containing resin composition) into contact with water. Thus, an electric wire having a coating layer formed of the heat-resistant chlorine-containing crosslinked resin formed body on an outer periphery of the above-described conductor was produced.

The heat-resistant chlorine-containing crosslinked resin formed body as the coating layer has the above-mentioned silane crosslinked resin.

On each electric wire produced, the following test was conducted, and the results are shown in Tables 3 and 4.

<Appearance Test>
1. Adhesive-Resistance Test Between Electric Wires (Appearance Roughness Test)

Appearance of the heat-resistant chlorine-containing crosslinked resin formed body was evaluated by rewinding the electric wire from the bobbin and confirming an adhesion state between the electric wires. Specifically, a surface of the electric wire rewound was observed, and a case where external damage was unable to be confirmed on the coating layer was deemed as "A", a case where a wispy adhesion (bonding) mark was able to be confirmed only on the surface was deemed as "B", and a case where scratch was able to be confirmed was deemed as "D".

In this test, "B" evaluation or better is a pass level.

2. Extrusion Appearance Test

As an extrusion appearance test, appearance of the coated conductor was observed and evaluated in producing the coated conductor.

A product that was able to be formed into an electric wire form without the aggregated substance on the appearance of the coated conductor was expressed as "A", a product a surface of which was a little roughened even without the aggregated substance on the appearance of the coated conductor was expressed as "B", a product that was able to be formed into an electric wire form, although generation of the aggregated substance was able to be confirmed even at a degree of having no problem on the appearance, was expressed as "C", and a product that was unable to be formed into an electric wire form by significant generation of poor appearance was expressed as "D". In the extrusion appearance test, "C" evaluation or better is a pass level of this test.

<Heat Deformation Test>
A heat deformation test was conducted on each electric wire produced at a measuring temperature of 150° C. and a load of 5 N based on UL1581.

In this test, with regard to heat deformation, a case where a deformation ratio was 50% or less was deemed as pass.

<Hot Set Test>
A hot set test was conducted by using a tubular piece prepared by extracting a conductor from each electric wire produced. In the hot set test, marker lines having a length of 50 mm were attached on the tubular piece, and then the tubular piece to which a weight of 117 g was attached was left to stand in a constant temperature chamber at a temperature of 170° C. for 15 minutes, and elongation was determined by measuring a length after being left to stand.

A case where elongation was 70% or less was deemed as "A", a case where elongation was more than 70% and 100% or less was deemed as "B", and a case where elongation was more than 100% was deemed as "D". In this test, "B" evaluation or better is a pass level.

<Tensile Strength Test>
Tensile strength was measured by conducting a tensile test by using a tubular piece prepared by extracting a conductor from each electric wire, under a gauge length of 20 mm and a tensile speed of 200 mm/min, based on JIS C 3005.

This test is a reference test, and a case where tensile strength is 11 MPa or more is deemed as a pass, and tensile strength is preferably 14 MPa or more.

TABLE 3

|  |  |  |  | This invention ||||| |
|---|---|---|---|---|---|---|---|---|
|  |  |  |  | 1B | 2B | 3B | 4B | 5B |
| Silane MB | Base resin | Chlorinated polyethylene | ELASLEN 401A | 55 | 55 |  | 55 | 55 |
|  |  |  | ELASLEN 402NA-X5 |  |  |  |  |  |
|  |  |  | ELASLEN 351A |  |  |  |  |  |
|  |  |  | ELASLEN 301A |  |  | 55 |  |  |
|  |  | Chloroprene rubber | SKYPRENE E-33 |  |  |  |  |  |
|  |  | Polyvinyl chloride | ZEST 1400 | 25 |  |  | 25 | 25 |
|  |  |  | ZEST 1000 |  | 25 |  |  |  |
|  |  |  | ZEST 2500 |  |  | 25 |  |  |
|  |  | Trimellitic acid-based plasticizer | ADK CIZER C-9N | 10 | 10 | 10 |  |  |
|  |  | Polyester-based plasticizer | ADK CIZER PN-650 |  |  |  | 10 |  |
|  |  | Phthalic acid-based plasticizer | Shell DL911P |  |  |  |  | 10 |
|  |  | Ethylene-vinyl acetate copolymer | EV180 |  |  |  |  |  |
|  |  | Polyester elastomer | Hytrel 2401 |  |  |  |  |  |
|  |  | Modified EVA | BY27-220 |  |  |  |  |  |
|  | Organic peroxide |  | PERHEXA 25B | 0.1 |  | 0.15 | 0.25 | 0.1 |
|  |  |  | PERCUMYL D |  | 0.08 |  |  |  |
|  | Inorganic filler | Hydrotalcite | DHT4A | 4 | 4 | 4 | 4 | 4 |
|  |  | Magnesium hydroxide | KISUMA 5L |  |  | 60 | 60 | 120 |
|  |  | Silica | CRYSTALITE 5X | 10 |  |  |  |  |
|  |  | Calcium carbonate | SOFTON 2200 |  |  |  |  |  |
|  |  | Silica | Aerosil 200 | 5 | 10 |  |  | 5 |
|  | Silane coupling agent | Vinyltrimethoxysilane | KBM-1003 | 5 | 5 | 2.5 | 5 | 10 |
|  |  | Vinyltriethoxysilane | KBE-1003 |  |  |  |  |  |

TABLE 3-continued

| | | | | | | | | | |
|---|---|---|---|---|---|---|---|---|---|
| Catalyst MB | Carrier resin | Chlorinated polyethylene | ELASLEN 402NA-X5 | 10 | 10 | 7 | 6 | 10 | |
| | | Polyvinyl chloride | ZEST 1400 | | | 3 | 3 | | |
| | | Trimellitic acid-based plasticizer | ADKSTAB C-9N | | | | 1 | | |
| | Silanol condensation catalyst | Dioctyltin dilaurate | ADKSTAB OT-1 | 0.05 | 0.05 | 0.05 | 0.05 | 0.05 | |
| | Antioxidizing agent | Hindered phenol | IRGANOX 1010 | 0.1 | 0.1 | 0.1 | 0.1 | 0.1 | |
| | Evaluation | Heat deformation test (%) | | 24 | 23 | 19 | 17 | 23 | |
| | | Tensile strength test (MPa) | | 20 | 16 | 14 | 15 | 16 | |
| | | Hot set test | | A | A | A | A | A | |
| | | Adhesive-resistance test between electric wires | | A | A | B | A | A | |
| | | Extrusion appearance test | | A | A | B | B | A | |

| | | | | This invention ||||||
|---|---|---|---|---|---|---|---|---|---|
| | | | | 6B | 7B | 8B | 9B | 10B |
| Silane MB | Base resin | Chlorinated polyethylene | ELASLEN 401A | | | | | 45 |
| | | | ELASLEN 402NA-X5 | 60 | | 35 | 85 | |
| | | | ELASLEN 351A | | 70 | | | |
| | | | ELASLEN 301A | | | | | |
| | | Chloroprene rubber | SKYPRENE E-33 | 10 | | | | |
| | | Polyvinyl chloride | ZEST 1400 | 20 | 15 | | | 30 |
| | | | ZEST 1000 | | | 45 | 5 | |
| | | | ZEST 2500 | | | | | |
| | | Trimellitic acid-based plasticizer | ADK CIZER C-9N | | | 10 | | |
| | | Polyester-based plasticizer | ADK CIZER PN-650 | | 5 | | | 15 |
| | | Phthalic acid-based plasticizer | Shell DL911P | | | | | |
| | | Ethylene-vinyl acetate copolymer | EV180 | | | | | |
| | | Polyester elastomer | Hytrel 2401 | | | | | |
| | | Modified EVA | BY27-220 | | | | | |
| | Organic peroxide | | PERHEXA 25B | | 0.1 | 0.1 | 0.1 | 0.1 |
| | | | PERCUMYL D | 0.02 | | | | |
| | Inorganic filler | Hydrotalcite | DHT4A | 1 | 4 | 4 | 4 | 4 |
| | | Magnesium hydroxide | KISUMA 5L | | 40 | | | 250 |
| | | Silica | CRYSTALITE 5X | | | | | 30 |
| | | Calcium carbonate | SOFTON 2200 | | | 50 | | |
| | | Silica | Aerosil 200 | 2 | 1 | 10 | 5 | 2 |
| | Silane coupling agent | Vinyltrimethoxysilane | KBM-1003 | 3 | 8 | 5 | 5 | 15 |
| | | Vinyltriethoxysilane | KBE-1003 | | | | | |
| Catalyst MB | Carrier resin | Chlorinated polyethylene | ELASLEN 402NA-X5 | 7 | 10 | 10 | 10 | 10 |
| | | Polyvinyl chloride | ZEST 1400 | 3 | | | | |
| | | Trimellitic acid-based plasticizer | ADKSTAB C-9N | | | | | |
| | Silanol condensation catalyst | Dioctyltin dilaurate | ADKSTAB OT-1 | 0.05 | 0.05 | 0.05 | 0.05 | 0.05 |
| | Antioxidizing agent | Hindered phenol | IRGANOX 1010 | 0.1 | 0.1 | 0.1 | 0.1 | 0.1 |
| | Evaluation | Heat deformation test (%) | | 46 | 28 | 27 | 24 | 25 |
| | | Tensile strength test (Mpa) | | 16 | 18 | 15 | 13 | 11 |
| | | Hot set test | | B | A | B | A | B |
| | | Adhesive-resistance test between electric wires | | A | A | A | B | B |
| | | Extrusion appearance test | | A | B | A | A | A |

TABLE 4

| | | | | This invention ||||
|---|---|---|---|---|---|---|---|
| | | | | 11B | 12B | 13B | 14B |
| Silane MB | Base resin | Chlorinated polyethylene | ELASLEN 401A | 40 | 50 | | |
| | | | ELASLEN 402NA-X5 | 10 | | 55 | 65 |
| | | | ELASLEN 351A | | | | |
| | | | ELASLEN 301A | | | | |

TABLE 4-continued

|  |  |  |  | | | | |
|---|---|---|---|---|---|---|---|
|  |  | Chloroprene rubber | SKYPRENE E-33 | 5 |  |  |  |
|  |  | Polyvinyl chloride | ZEST 1400 | 25 | 20 |  |  |
|  |  |  | ZEST 1000 |  |  | 20 | 20 |
|  |  |  | ZEST 2500 |  |  |  |  |
|  |  | Trimellitic acid-based plasticizer | ADK CIZER C-9N | 10 | 10 |  |  |
|  |  | Polyester-based plasticizer | ADK CIZER PN-650 |  |  | 5 |  |
|  |  | Phthalic acid-based plasticizer | Shell DL911P |  |  |  |  |
|  |  | Ethylene-vinyl acetate copolymer | EV180 |  |  | 10 |  |
|  |  | Polyester elastomer | Hytrel 2401 |  | 10 |  |  |
|  |  | Modified EVA | BY27-220 |  |  |  | 5 |
|  | Organic peroxide |  | PERHEXA 25B | 0.1 | 0.1 | 0.1 | 0.2 |
|  |  |  | PERCUMYL D |  |  |  |  |
|  | Inorganic filler | Hydrotalcite | DHT4A | 4 | 4 | 4 | 4 |
|  |  | Magnesium hydroxide | KISUMA 5L |  |  | 50 | 60 |
|  |  | Silica | CRYSTALITE 5X |  |  |  |  |
|  |  | Calcium carbonate | SOFTON 2200 | 30 | 50 | 10 |  |
|  |  | Silica | Aerosil 200 | 5 | 3 |  | 5 |
|  | Silane coupling agent | Vinyltrimethoxysilane | KBM-1003 | 5 | 5 | 5 | 15 |
|  |  | Vinyltriethoxysilane | KBE-1003 |  |  |  |  |
| Catalyst MB | Carrier resin | Chlorinated polyethylene | ELASLEN 402NA-X5 | 7 | 7 | 10 | 10 |
|  |  | Polyvinyl chloride | ZEST 1400 | 3 | 3 |  |  |
|  |  | Trimellitic acid-based plasticizer | ADKSTAB C-9N |  |  |  |  |
|  | Silanol condensation catalyst | Dioctyltin dilaurate | ADKSTAB OT-1 | 0.05 | 0.05 | 0.05 | 0.05 |
|  | Antioxidizing agent | Hindered phenol | IRGANOX 1010 | 0.1 | 0.1 | 0.1 | 0.1 |
|  | Evaluation | Heat deformation test (%) |  | 18 | 24 | 25 | 18 |
|  |  | Tensile strength test (Mpa) |  | 19 | 22 | 13 | 16 |
|  |  | Hot set test |  | A | A | A | B |
|  |  | Adhesive-resistance test between electric wires |  | A | A | A | A |
|  |  | Extrusion appearance test |  | A | A | B | B |

|  |  |  |  | Comparative example | | | | |
|---|---|---|---|---|---|---|---|---|
|  |  |  |  | 1B | 2B | 3B | 4B | 5B |
| Silane MB | Base resin | Chlorinated polyethylene | ELASLEN 401A |  |  | 70 | 55 | 50 |
|  |  |  | ELASLEN 402NA-X5 | 90 | 90 |  |  |  |
|  |  |  | ELASLEN 351A |  |  |  |  |  |
|  |  |  | ELASLEN 301A |  |  |  |  |  |
|  |  | Chloroprene rubber | SKYPRENE E-33 |  |  |  |  |  |
|  |  | Polyvinyl chloride | ZEST 1400 |  |  |  | 25 |  |
|  |  |  | ZEST 1000 |  |  |  |  |  |
|  |  |  | ZEST 2500 |  |  |  |  |  |
|  |  | Trimellitic acid-based plasticizer | ADK CIZER C-9N |  |  | 20 | 10 | 20 |
|  |  | Polyester-based plasticizer | ADK CIZER PN-650 |  |  |  |  |  |
|  |  | Phthalic acid-based plasticizer | Shell DL911P |  |  |  |  |  |
|  |  | Ethylene-vinyl acetate copolymer | EV180 |  |  |  |  |  |
|  |  | Polyester elastomer | Hytrel 2401 |  |  |  |  | 20 |
|  |  | Modified EVA | BY27-220 |  |  |  |  |  |
|  | Organic peroxide |  | PERHEXA 25B | 0.1 | 0.15 | 0.1 | 0.5 | 0.1 |
|  |  |  | PERCUMYL D |  |  |  |  |  |
|  | Inorganic filler | Hydrotalcite | DHT4A | 4 | 4 | 4 | 4 | 4 |
|  |  | Magnesium hydroxide | KISUMA 5L |  | 250 |  |  | 50 |
|  |  | Silica | CRYSTALITE 5X | 10 |  | 10 | 10 |  |
|  |  | Calcium carbonate | SOFTON 2200 |  |  |  |  |  |
|  |  | Silica | Aerosil 200 | 5 |  | 5 | 5 | 5 |
|  | Silane coupling agent | Vinyltrimethoxysilane | KBM-1003 | 5 | 5 | 5 | 5 | 5 |
|  |  | Vinyltriethoxysilane | KBE-1003 |  |  |  |  |  |
| Catalyst MB | Carrier resin | Chlorinated polyethylene | ELASLEN 402NA-X5 | 10 | 10 | 10 | 10 | 10 |
|  |  | Polyvinyl chloride | ZEST 1400 |  |  |  |  |  |
|  |  | Trimellitic acid-based plasticizer | ADKSTAB C-9N |  |  |  |  |  |
|  | Silanol condensation catalyst | Dioctyltin dilaurate | ADKSTAB OT-1 | 0.05 | 0.05 | 0.05 | 0.05 | 0.05 |
|  | Antioxidizing agent | Hindered phenol | IRGANOX 1010 | 0.1 | 0.1 | 0.1 | 0.1 | 0.1 |

TABLE 4-continued

| Evaluation | Heat deformation test (%) | 25 | 28 | 32 | Could not be extruded | 34 |
|---|---|---|---|---|---|---|
| | Tensile strength test (Mpa) | 13 | 6 | 8 | | 8 |
| | Hot set test | A | B | B | | B |
| | Adhesive-resistance test between electric wires | D | D | D | | D |
| | Extrusion appearance test | A | A | A | | A |

The results in Tables 3 and 4 suggest the following.

In all of Comparative Examples 1B to 3B and 5B in which the base resin without containing polyvinyl chloride was used, the formed bodies of the heat-resistant crosslinkable chlorine-containing resin composition were adhered to each other, and the external damage was caused on the coating layer, and appearance roughness was observed. In addition, in Comparative Example 4B in which the content of the organic peroxide was excessively large, the extrusion forming was unable to be performed.

In contrast, all in Examples 1B to 14B in which the base resin containing polyvinyl chloride was used had excellent appearance. That is, in all the electric wires, the external damage was unable to be confirmed on the coating layer and the extrusion appearance was also excellent. In particular, if the content of polyvinyl chloride in the base resin was 10 to 40% by mass, and the content of the silane coupling agent was 3 to 12 parts by mass, the electric wire having the coating layer free from the aggregated substance and the external damage was able to be produced (Examples 1B, 2B, 4B to 7B and 11B to 13B).

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method for producing a heat-resistant chlorine-containing crosslinked resin formed body, the method comprising:
   (a) melt-mixing 0.003 to 0.3 part by mass of an organic peroxide, 0.5 to 400 parts by mass of an inorganic filler, and more than 2 parts by mass and 15.0 parts by mass or less of a silane coupling agent, with respect to 100 parts by mass of a base resin comprising a chlorinated polyethylene, at a temperature equal to or higher than a decomposition temperature of the organic peroxide, to prepare a silane master batch;
   (b) mixing the silane master batch obtained in the melt-mixing (a) with a silanol condensation catalyst, to form a resultant mixture; and
   (c) bringing the resultant mixture obtained in the mixing (b) into contact with moisture, to cause crosslinking, and form the crosslinked resin formed body,
   wherein the melt-mixing (a) and/or the mixing (b) is performed in the presence of a chloroprene rubber or a polyvinyl chloride,
   wherein the silane master batch comprises no ethylenic copolymer or polyolefin resin.

2. The method of claim 1, wherein a content of the organic peroxide is 0.003 to 0.2 part by mass, and
   wherein the melt-mixing (a) and/or the mixing (b) is performed in the presence of the chloroprene rubber.

3. The method of claim 2, wherein the mixing (b) is performed in the presence of the chloroprene rubber.

4. The method of claim 1, wherein a content of the organic peroxide is 0.005 to 0.2 part by mass.

5. The method of claim 1, wherein the melt-mixing (a) and/or the mixing (b) is performed in the presence of the polyvinyl chloride.

6. The method of claim 5, wherein the melt-mixing (a) is performed in the presence of the polyvinyl chloride.

7. The method of claim 5, wherein a percentage content of the polyvinyl chloride in the base resin is in a range of from 5 to 50% by mass.

8. The method of claim 5, wherein a percentage content of the polyvinyl chloride in the base resin is in a range of from 10 to 40% by mass.

9. The method of claim 5, wherein the base resin comprises a plasticizer and/or an oil in a percentage content in a range of from more than 0 to 35% by mass in the base resin.

10. The method of claim 9, wherein the percentage content of the plasticizer and the oil is equal to or less than a percentage content of the polyvinyl chloride.

11. The method of claim 1, wherein a content of the organic peroxide is 0.005 to 0.3 part by mass.

12. The method of claim 1, wherein a content of the silane coupling agent is 3 to 12.0 parts by mass.

13. The method of claim 1, wherein a content of the silane coupling agent is 4 to 12.0 parts by mass.

14. The method of claim 1, wherein the silane coupling agent is vinyltrimethoxysilane or vinyltriethoxysilane.

15. The method of claim 1, wherein the inorganic filler is silica, aluminum hydroxide, magnesium hydroxide, calcium carbonate, or any combination of these.

16. The method of claim 1, wherein the melt-kneading in the melt-mixing (a) is performed using an enclosed mixer.

* * * * *